US012694713B1

(12) United States Patent
Svendsen

(10) Patent No.: US 12,694,713 B1
(45) **Date of Patent: *Jul. 28, 2026**

(54) OPERATING A DRONE DEVICE BASED ON CAPTURE INSTRUCTIONS DETERMINED FROM A COLLECTION OF IMAGES

(71) Applicant: Ikorongo Technology, LLC, Swansboro, NC (US)

(72) Inventor: Hugh Blake Svendsen, Swansboro, NC (US)

(73) Assignee: Ikorongo Technology, LLC, Swansboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/017,641

(22) Filed: Jan. 11, 2025

Related U.S. Application Data

(63) Continuation of application No. 18/425,379, filed on Jan. 29, 2024, now Pat. No. 12,298,786, which is a
(Continued)

(51) Int. Cl.
  H04N 7/18 (2006.01)
  B64U 10/14 (2023.01)
  (Continued)

(52) U.S. Cl.
  CPC ........... G06V 40/172 (2022.01); B64U 10/14 (2023.01); G05D 1/686 (2024.01); G06Q 10/40 (2026.01); G06V 10/95 (2022.01); G06V 20/13 (2022.01); G06V 20/17 (2022.01); G06V 20/30 (2022.01); G06V 40/161 (2022.01); H04N 23/611 (2023.01);

H04N 23/661 (2023.01); H04W 4/029 (2018.02); B64U 2101/30 (2023.01); G05D 2105/30 (2024.01);
(Continued)

(58) Field of Classification Search
  CPC ............. H04N 7/18; H04N 5/225; H04N 3/02
  USPC ................................... 348/144, 143, 61, 169
  See application file for complete search history.

(56) References Cited

U.S. PATENT DOCUMENTS

| | | |
|---|---|---|
| 6,526,158 B1 | 2/2003 | Goldberg |
| 6,591,068 B1 | 7/2003 | Dietz |

(Continued)

FOREIGN PATENT DOCUMENTS

| | | |
|---|---|---|
| CN | 106791443 A | 5/2017 |
| WO | 2009070841 A1 | 6/2009 |

(Continued)

OTHER PUBLICATIONS

Glaser; April, DJI's new portable drone is so smart it will follow you around like a dog, "https://www.recode.net/2016/9/27/13069356/dji-portable-drone-smart-ai-selfies-photography", Sep. 27, 2016.
(Continued)

*Primary Examiner* — Daquan Zhao

(57) ABSTRACT

One method of using a computer-implemented method of operating a drone device comprises receiving capture instructions identifying one or more subject faces found in a collection of images stored at a user device; positioning the drone device based on priorities assigned to the one or more subject faces; and capturing an image including the one or more subject faces identified in the capture instructions.

20 Claims, 23 Drawing Sheets

Related U.S. Application Data continuation of application No. 17/839,140, filed on Jun. 13, 2022, now Pat. No. 11,889,183, which is a continuation of application No. 17/098,554, filed on Nov. 16, 2020, now Pat. No. 11,363,185, which is a continuation of application No. 16/134,122, filed on Sep. 18, 2018, now Pat. No. 10,880,465.

(60) Provisional application No. 62/666,781, filed on May 4, 2018, provisional application No. 62/561,254, filed on Sep. 21, 2017.

(51) Int. Cl.

| | |
|---|---|
| *G05D 1/686* | (2024.01) |
| *G06Q 10/40* | (2026.01) |
| *G06V 10/94* | (2022.01) |
| *G06V 20/13* | (2022.01) |
| *G06V 20/17* | (2022.01) |
| *G06V 20/30* | (2022.01) |
| *G06V 40/16* | (2022.01) |
| *H04N 23/611* | (2023.01) |
| *H04N 23/661* | (2023.01) |
| *H04W 4/029* | (2018.01) |
| *B64U 101/30* | (2023.01) |
| *G05D 105/30* | (2024.01) |
| *G05D 109/20* | (2024.01) |
| *G05D 111/10* | (2024.01) |
| *G05D 111/30* | (2024.01) |
| *H04N 3/02* | (2006.01) |

(52) U.S. Cl.

CPC ...... *G05D 2109/20* (2024.01); *G05D 2111/10* (2024.01); *G05D 2111/32* (2024.01)

(56) References Cited

U.S. PATENT DOCUMENTS

| | | | |
|---|---|---|---|
| 6,745,186 | B1 | 6/2004 | Testa |
| 6,819,783 | B2 | 11/2004 | Goldberg |
| 7,035,440 | B2 | 4/2006 | Kaku |
| 7,260,587 | B2 | 8/2007 | Testa |
| 7,391,886 | B1 | 6/2008 | Clark |
| 7,472,134 | B2 | 12/2008 | Kaku |
| 7,526,106 | B1 | 4/2009 | Clark |
| 7,561,723 | B2 | 7/2009 | Goldberg |
| 7,619,660 | B2 | 11/2009 | Grosvenor |
| 7,730,036 | B2 | 6/2010 | Blose |
| 7,881,968 | B2 | 2/2011 | David |
| 7,953,690 | B2 | 5/2011 | Luo |
| 7,965,908 | B2 | 6/2011 | Hayashi |
| 7,966,223 | B2 | 6/2011 | David |
| 8,014,572 | B2 | 9/2011 | Xiao et al. |
| 8,189,880 | B2 | 5/2012 | Wen et al. |
| 8,260,674 | B2 | 9/2012 | David |
| 8,284,990 | B2 | 10/2012 | Ma et al. |
| 8,306,284 | B2 | 11/2012 | Goldberg et al. |
| 8,458,174 | B1 | 6/2013 | Duerig |
| 8,510,383 | B2 | 8/2013 | Hurley et al. |
| 8,543,454 | B2 | 9/2013 | Fleischman et al. |
| 8,612,533 | B1 | 12/2013 | Harris et al. |
| 8,731,819 | B2 | 5/2014 | Dzubay et al. |
| 8,761,523 | B2 | 6/2014 | Cok et al. |
| 9,612,599 | B2 | 4/2017 | Bradlow et al. |
| 9,953,540 | B2 | 4/2018 | Macfarlane et al. |
| 11,404,056 | B1 | 8/2022 | Meisenholder et al. |
| 2003/0233364 | A1 | 12/2003 | Nakao et al. |
| 2007/0250496 | A1 | 10/2007 | Halliday et al. |
| 2008/0052349 | A1 | 2/2008 | Lin |
| 2008/0235084 | A1 | 9/2008 | Quoc et al. |
| 2008/0310688 | A1 | 12/2008 | Goldberg |
| 2009/0158146 | A1 | 6/2009 | Curtis et al. |
| 2009/0319559 | A1 | 12/2009 | Westerfeld |
| 2010/0036875 | A1 | 2/2010 | Miezianko |
| 2010/0103463 | A1 | 4/2010 | Joshi |
| 2010/0191728 | A1 | 7/2010 | Reilly |
| 2010/0250672 | A1 | 9/2010 | Vance et al. |
| 2010/0325057 | A1 | 12/2010 | Jain |
| 2011/0022529 | A1 | 1/2011 | Barsoba |
| 2011/0137989 | A1 | 6/2011 | Kiciman |
| 2011/0145275 | A1 | 6/2011 | Stewart |
| 2011/0161423 | A1 | 6/2011 | Pratt |
| 2011/0182485 | A1 | 7/2011 | Shochat |
| 2011/0188742 | A1 | 8/2011 | Yu et al. |
| 2011/0196923 | A1 | 8/2011 | Marcucci et al. |
| 2011/0211737 | A1 | 9/2011 | Krupka et al. |
| 2012/0166533 | A1 | 6/2012 | Rubinstein et al. |
| 2012/0213404 | A1 | 8/2012 | Steiner |
| 2012/0221687 | A1 | 8/2012 | Hunter et al. |
| 2012/0250950 | A1 | 10/2012 | Papakipos et al. |
| 2012/0265758 | A1 | 10/2012 | Han et al. |
| 2012/0278387 | A1 | 11/2012 | Garcia et al. |
| 2012/0278395 | A1 | 11/2012 | Garcia |
| 2012/0278413 | A1 | 11/2012 | Walsh et al. |
| 2013/0066975 | A1 | 3/2013 | Kantor et al. |
| 2013/0117365 | A1 | 5/2013 | Padmanabhan et al. |
| 2013/0124508 | A1 | 5/2013 | Paris et al. |
| 2013/0129232 | A1 | 5/2013 | Cok et al. |
| 2013/0130729 | A1 | 5/2013 | Cok et al. |
| 2013/0194937 | A1 | 8/2013 | Sridhar et al. |
| 2013/0275505 | A1 | 10/2013 | Gauglitz et al. |
| 2014/0047027 | A1 | 2/2014 | Moyers |
| 2014/0122592 | A1 | 5/2014 | Houston et al. |
| 2014/0214843 | A1 | 7/2014 | Arvig |
| 2014/0282192 | A1 | 9/2014 | Grossman et al. |
| 2014/0316614 | A1 | 10/2014 | Newman |
| 2015/0019523 | A1 | 1/2015 | Lior et al. |
| 2015/0032478 | A1 | 1/2015 | Humpherys |
| 2015/0346932 | A1 | 12/2015 | Nuthulapati |
| 2015/0381760 | A1 | 12/2015 | Mate et al. |
| 2016/0286244 | A1 | 9/2016 | Chang et al. |
| 2016/0297545 | A1 | 10/2016 | Yang et al. |
| 2016/0313736 | A1 | 10/2016 | Schultz et al. |
| 2017/0024671 | A1 | 1/2017 | McCormack et al. |
| 2017/0048334 | A1 | 2/2017 | Shibahara et al. |
| 2017/0064181 | A1 | 3/2017 | Zhang et al. |
| 2017/0070358 | A1 | 3/2017 | Svendsen |
| 2017/0092109 | A1* | 3/2017 | Trundle .................. B60L 53/36 |
| 2017/0177925 | A1 | 6/2017 | Volkart |
| 2017/0180623 | A1 | 6/2017 | Lin |
| 2017/0235308 | A1 | 8/2017 | Gordon et al. |
| 2017/0308076 | A1 | 10/2017 | Tian et al. |
| 2017/0308087 | A1 | 10/2017 | Tian et al. |
| 2017/0322554 | A1 | 11/2017 | Lee et al. |
| 2017/0336203 | A1 | 11/2017 | Barnes et al. |
| 2018/0033312 | A1 | 2/2018 | DeLuca et al. |
| 2018/0149830 | A1* | 5/2018 | Kim ......................... G02B 7/28 |
| 2018/0157259 | A1 | 6/2018 | Myslinski |
| 2018/0285357 | A1 | 10/2018 | Chang et al. |
| 2018/0365839 | A1 | 12/2018 | Feng et al. |
| 2019/0112048 | A1 | 4/2019 | Culver |

FOREIGN PATENT DOCUMENTS

| | | |
|---|---|---|
| WO | 2016100601 A2 | 6/2016 |
| WO | 201720856 A1 | 2/2017 |

OTHER PUBLICATIONS

Goodin; Dan, Meet Snoopy: The DIY drone that tracks your devices just about anywhere, "https://arstechnica.com/information-technology/2014/03/meet-snoopy-the-diy-drone-that-tracks-your-devices-just-about-anywhere/", Mar. 26, 2014.

Team Commerse (No Author Attribution), Save $150 on this foldable, self-flying camera drone, "https://mashable.com/2017/11/24/hover-camera-camera-drone-foldable-black-friday-sale/#WSNCQUOS3aqZ", Nov. 24, 2017.

Erickson, On Location: Socio-locative Broadcasting As Situated Rhetorical Action, Stanford University Dissertations & Theses

(56)         References Cited

OTHER PUBLICATIONS 3343578, 2008, 151 pages, ISBN 9780549986065, ProQuest UMI Dissertations Publishing 2008, Ann Arbor, U.S.

* cited by examiner

SYSTEM DIAGRAM

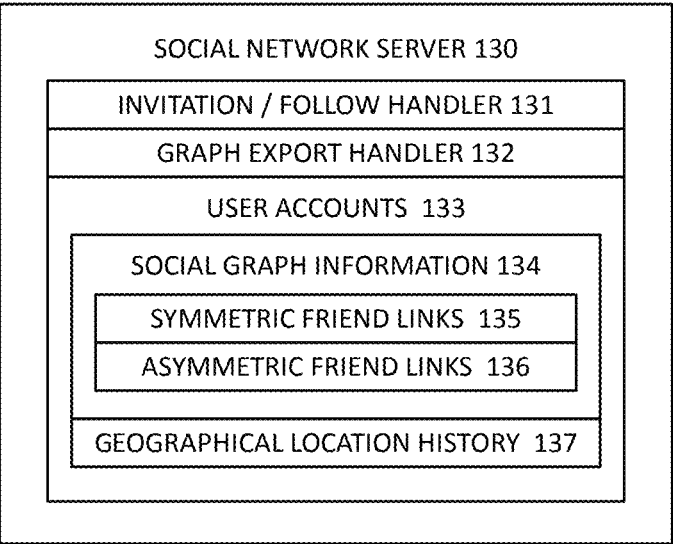

SOCIAL NETWORK SERVER 130

INVITATION / FOLLOW HANDLER 131

GRAPH EXPORT HANDLER 132

USER ACCOUNTS  133

SOCIAL GRAPH INFORMATION 134

SYMMETRIC FRIEND LINKS  135

ASYMMETRIC FRIEND LINKS  136

GEOGRAPHICAL LOCATION HISTORY  137

FIG. 1B

DRONE DEVICE INFORMATION 140

DRONE DEVICE IDENTIFIER  141

OWNER INFORMATION  142

OPERATOR(S) INFORMATION  143

SCHEDULE INFORMATION  144

CURRENT LOCATION 145

CAPTURE CAPABILITY 146

PRICING INFORMATION 147

RESTRICTIONS 148

STATUS 149

FIG. 1C

CONTROL INSTRUCTIONS 150

| POSITION HOLD  151 |
| RETURN TO HOME  152 |
| AUTONOMOUS FLIGHT  153 |
| TRACK SUBJECT  154 |
| CAPTURE  155 |
| POSITION CAMERA  156 |

CAPTURE INSTRUCTIONS 160

| FACTORS-OF-INTEREST 170 |
| REMUNERATION POLICY 180 |

FACTORS-OF-INTEREST 170

| SUBJECT FACES  171 |
| GEOGRAPHICAL AREAS  172 |
| TIME PERIODS  173 |
| EVENTS  174 |
| SOCIAL GRAPH  175 |
| SUBJECT TRACKING INFORMATION  176 |

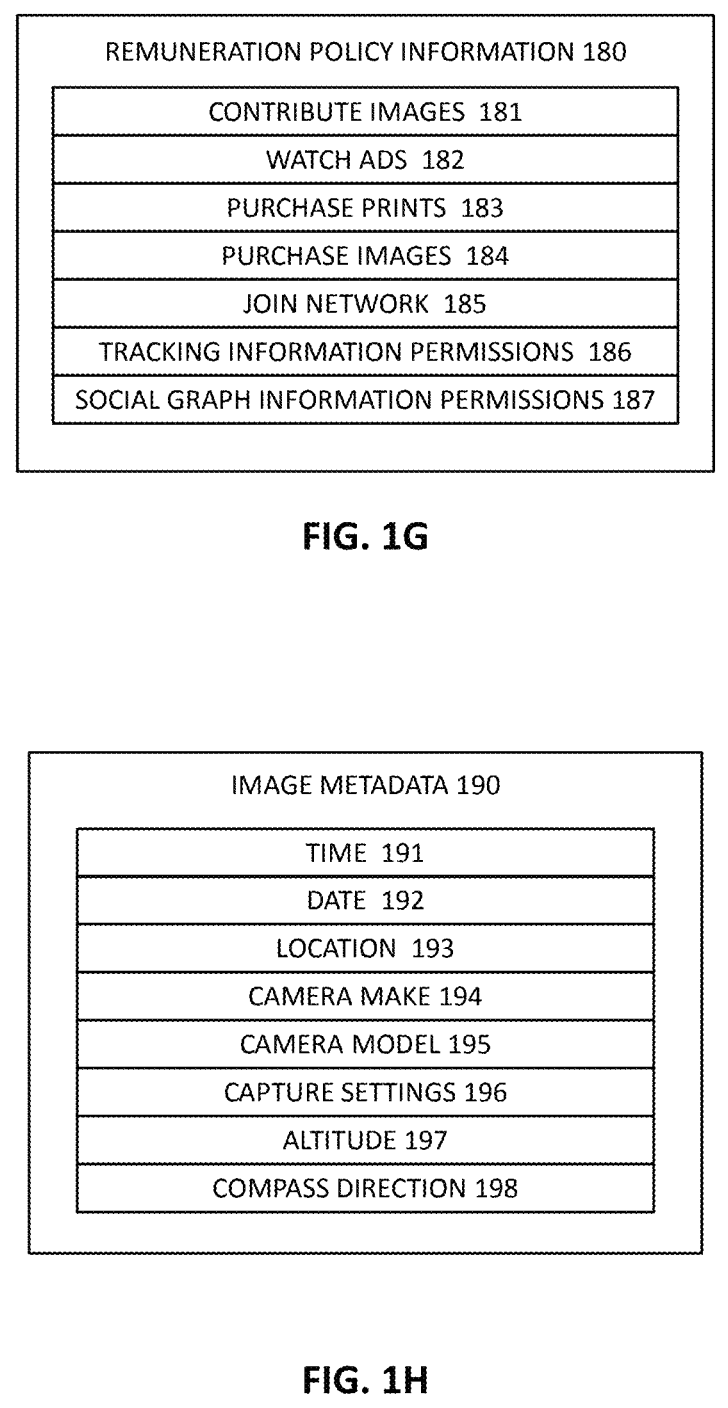

REMUNERATION POLICY INFORMATION 180

| CONTRIBUTE IMAGES 181 |
| WATCH ADS 182 |
| PURCHASE PRINTS 183 |
| PURCHASE IMAGES 184 |
| JOIN NETWORK 185 |
| TRACKING INFORMATION PERMISSIONS 186 |
| SOCIAL GRAPH INFORMATION PERMISSIONS 187 |

FIG. 1G

IMAGE METADATA 190

| TIME 191 |
| DATE 192 |
| LOCATION 193 |
| CAMERA MAKE 194 |
| CAMERA MODEL 195 |
| CAPTURE SETTINGS 196 |
| ALTITUDE 197 |
| COMPASS DIRECTION 198 |

FIG. 1H

NETWORK DIAGRAM
MOVING IMAGES OVER NETWORK BYPASSING OPERATOR DEVICE

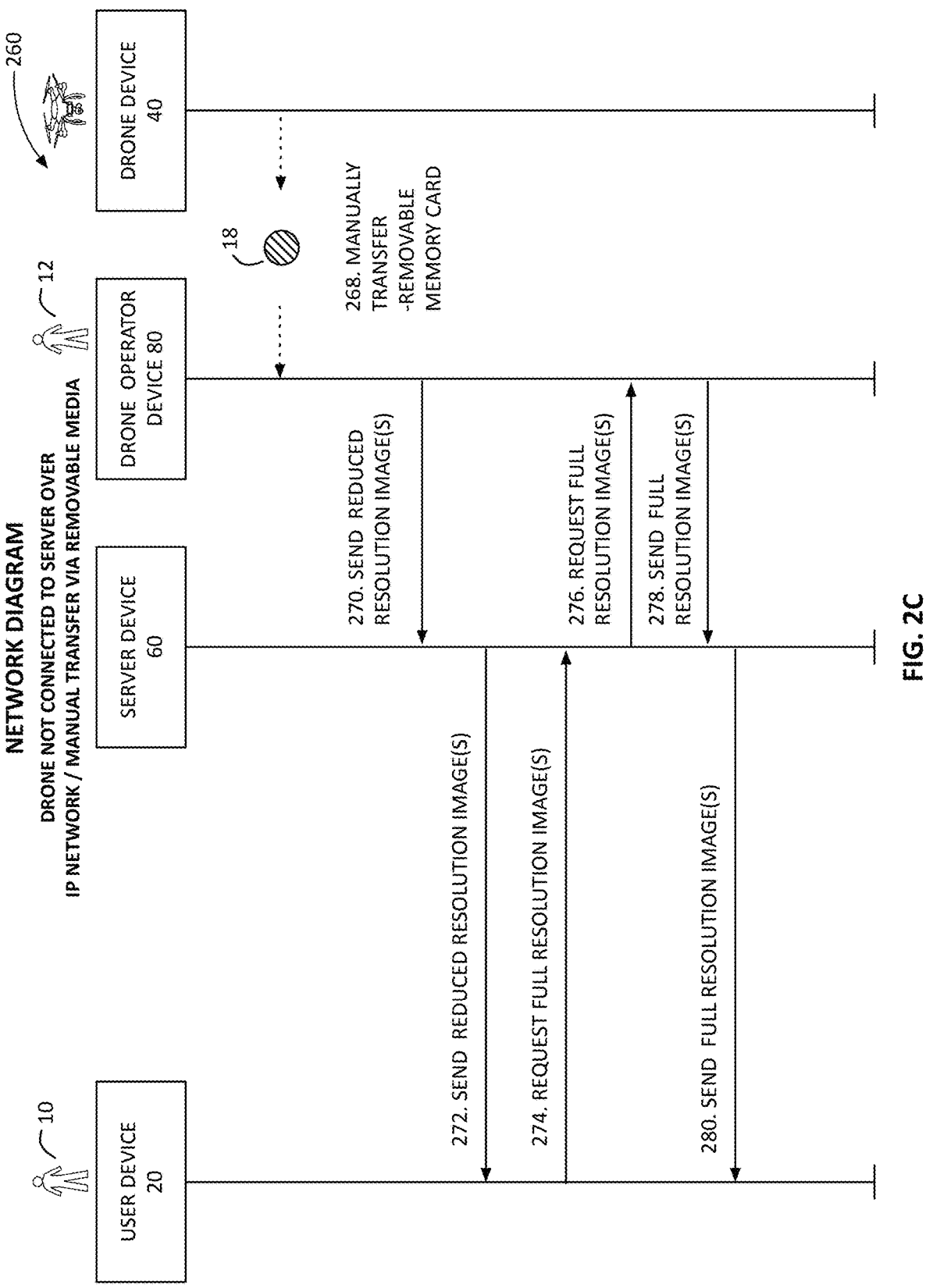

NETWORK DIAGRAM
DRONE NOT CONNECTED TO SERVER OVER
IP NETWORK / MANUAL TRANSFER VIA REMOVABLE MEDIA

260

DRONE DEVICE 40

12

18

268. MANUALLY TRANSFER -REMOVABLE MEMORY CARD

DRONE OPERATOR DEVICE 80

SERVER DEVICE 60

10

USER DEVICE 20

270. SEND REDUCED RESOLUTION IMAGE(S)

276. REQUEST FULL RESOLUTION IMAGE(S)

278. SEND FULL RESOLUTION IMAGE(S)

272. SEND REDUCED RESOLUTION IMAGE(S)

274. REQUEST FULL RESOLUTION IMAGE(S)

280. SEND FULL RESOLUTION IMAGE(S)

FIG. 2C

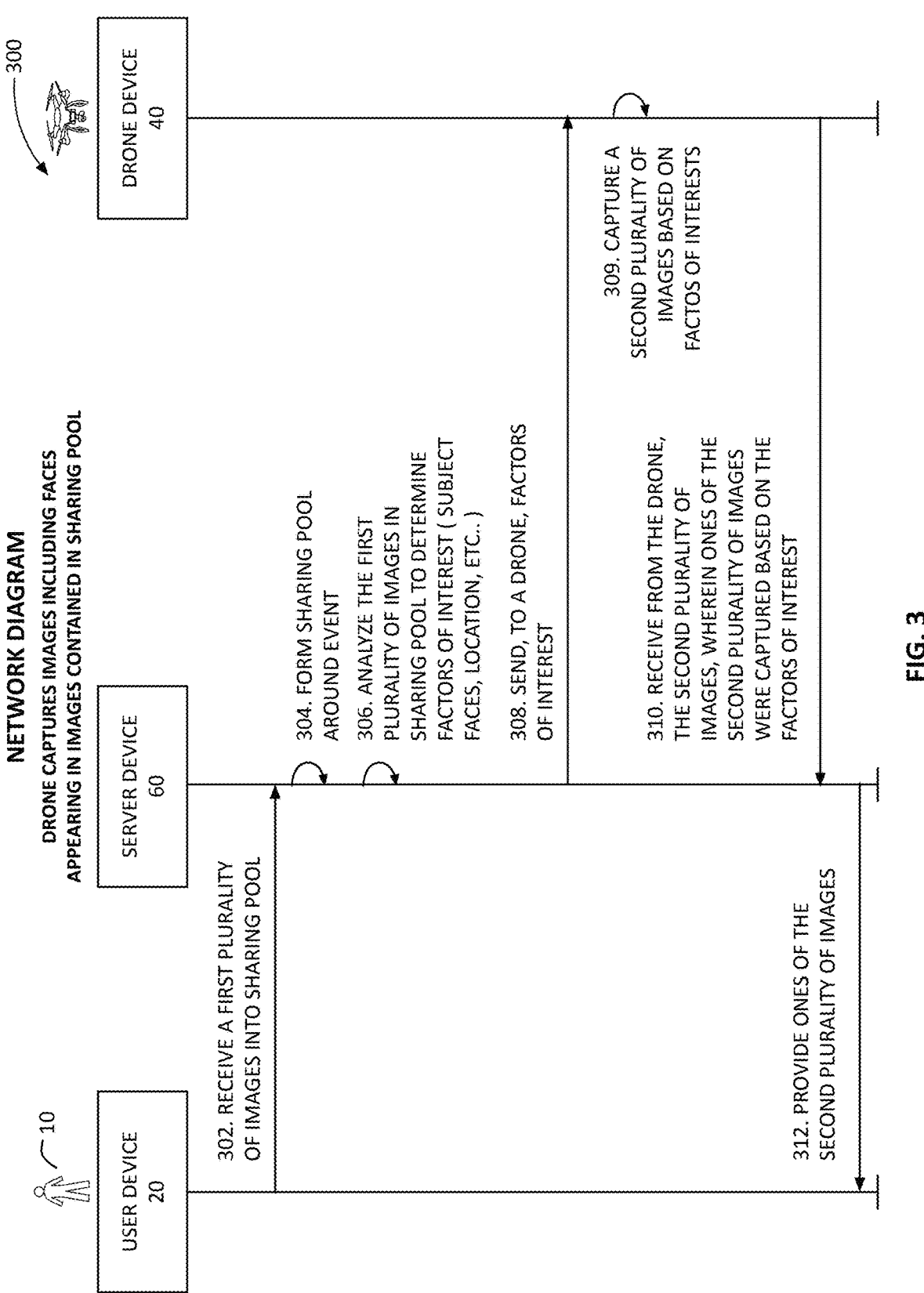

NETWORK DIAGRAM

DRONE CAPTURES IMAGES INCLUDING FACES APPEARING IN IMAGES CONTAINED IN SHARING POOL

300

DRONE DEVICE 40

SERVER DEVICE 60

USER DEVICE 20

10

302. RECEIVE A FIRST PLURALITY OF IMAGES INTO SHARING POOL

304. FORM SHARING POOL AROUND EVENT

306. ANALYZE THE FIRST PLURALITY OF IMAGES IN SHARING POOL TO DETERMINE FACTORS OF INTEREST ( SUBJECT FACES, LOCATION, ETC..)

308. SEND, TO A DRONE, FACTORS OF INTEREST

309. CAPTURE A SECOND PLURALITY OF IMAGES BASED ON FACTOS OF INTERESTS

310. RECEIVE FROM THE DRONE, THE SECOND PLURALITY OF IMAGES, WHEREIN ONES OF THE SECOND PLURALITY OF IMAGES WERE CAPTURED BASED ON THE FACTORS OF INTEREST

312. PROVIDE ONES OF THE SECOND PLURALITY OF IMAGES

FIG. 3

EXAMPLE COMPUTATION OF CAPTURE PRIORITY SCORES
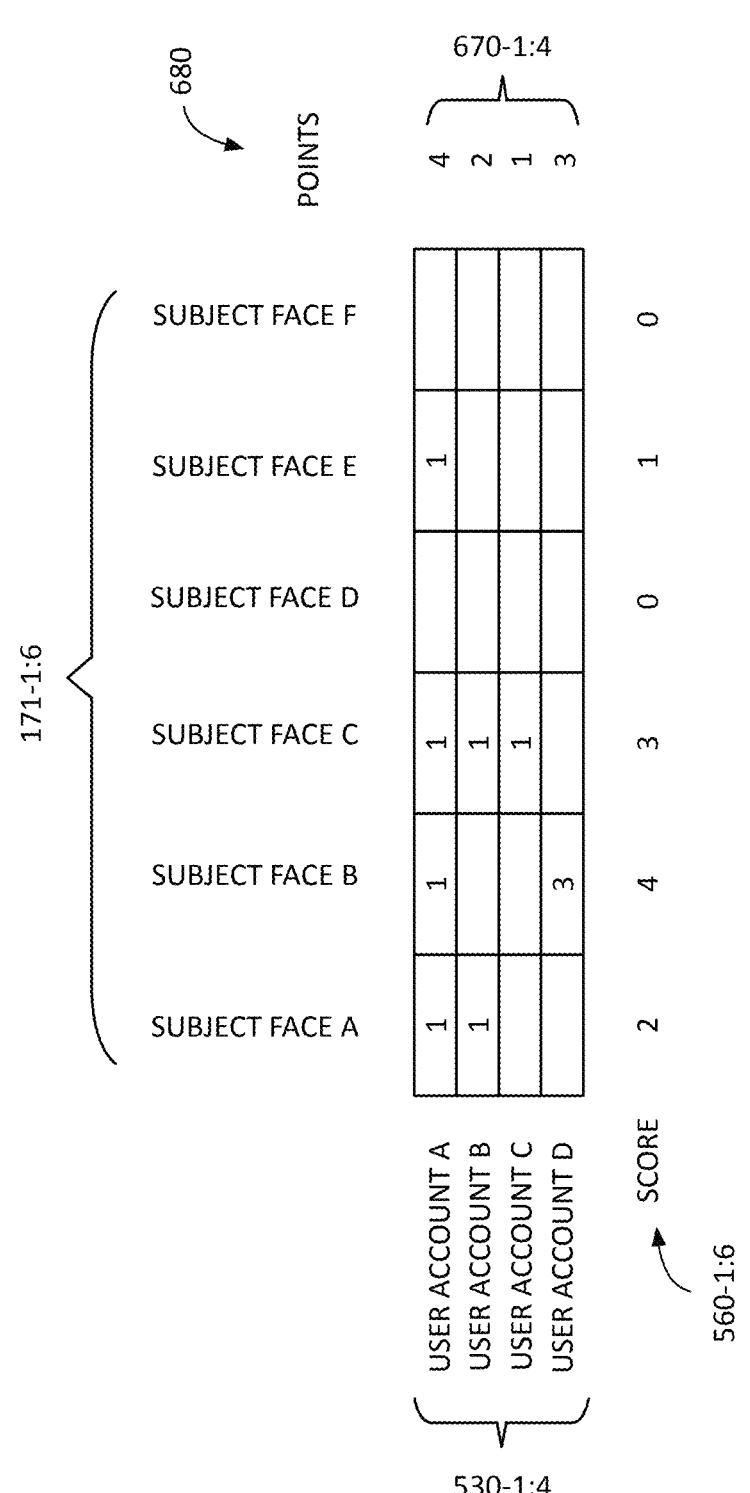
|  | SUBJECT FACE A | SUBJECT FACE B | SUBJECT FACE C | SUBJECT FACE D | SUBJECT FACE E | SUBJECT FACE F | POINTS |
|---|---|---|---|---|---|---|---|
| USER ACCOUNT A | 1 | 1 | 1 |  | 1 |  | 4 |
| USER ACCOUNT B | 1 |  | 1 |  |  |  | 2 |
| USER ACCOUNT C |  |  | 1 |  |  |  | 1 |
| USER ACCOUNT D |  | 3 |  |  |  |  | 3 |
| SCORE | 2 | 4 | 3 | 0 | 1 | 0 |  |
670-1:4
680
171-1:6
530-1:4
560-1:6
FIG. 5B

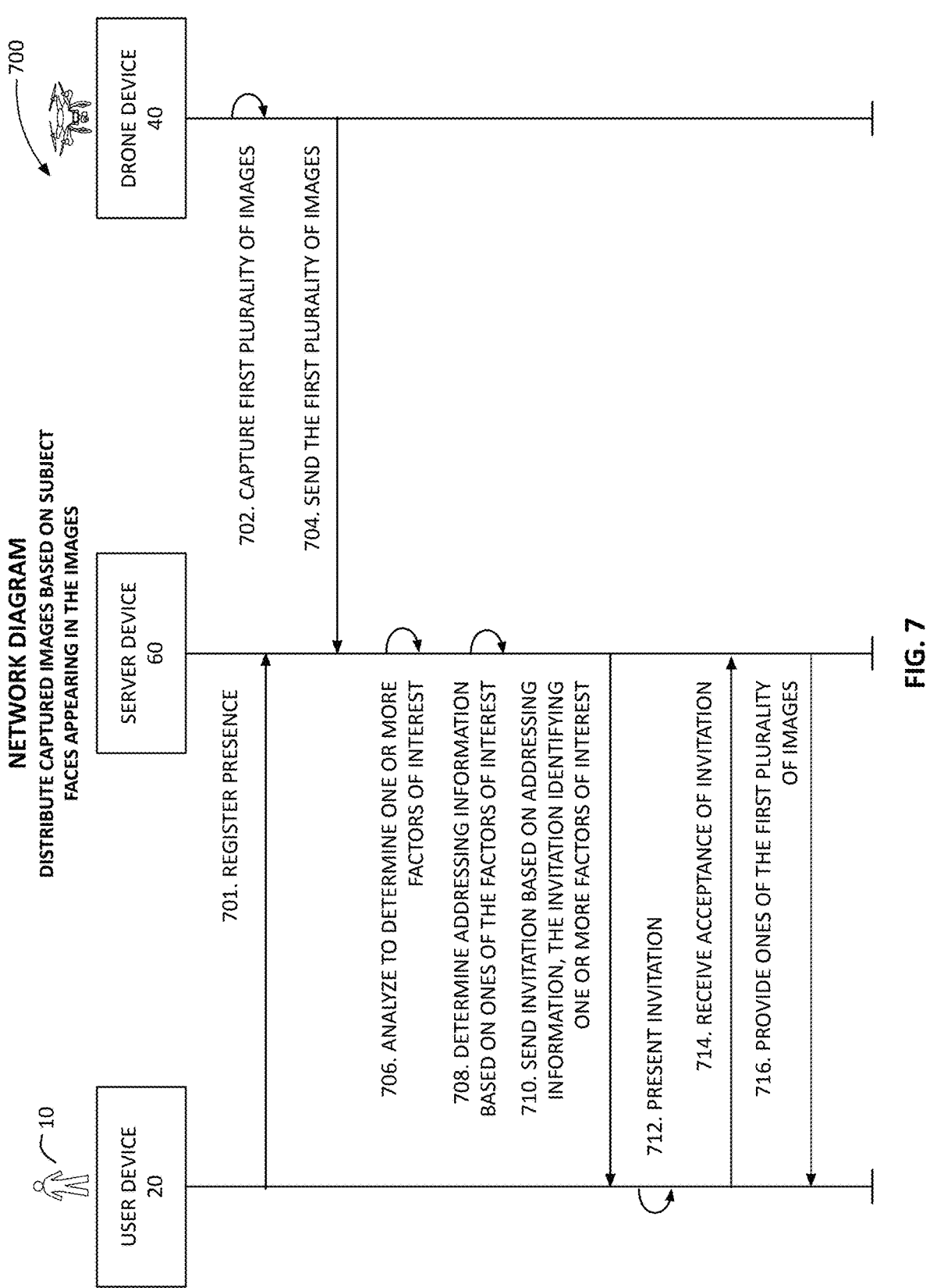

NETWORK DIAGRAM
DISTRIBUTE CAPTURED IMAGES BASED ON SUBJECT
FACES APPEARING IN THE IMAGES

700

DRONE DEVICE 40

SERVER DEVICE 60

USER DEVICE 20

701. REGISTER PRESENCE

702. CAPTURE FIRST PLURALITY OF IMAGES

704. SEND THE FIRST PLURALITY OF IMAGES

706. ANALYZE TO DETERMINE ONE OR MORE FACTORS OF INTEREST

708. DETERMINE ADDRESSING INFORMATION BASED ON ONES OF THE FACTORS OF INTEREST

710. SEND INVITATION BASED ON ADDRESSING INFORMATION, THE INVITATION IDENTIFYING ONE OR MORE FACTORS OF INTEREST

712. PRESENT INVITATION

714. RECEIVE ACCEPTANCE OF INVITATION

716. PROVIDE ONES OF THE FIRST PLURALITY OF IMAGES

FIG. 7

SERVER DEVICE

OPERATING A DRONE DEVICE BASED ON CAPTURE INSTRUCTIONS DETERMINED FROM A COLLECTION OF IMAGES

CROSS REFERENCE TO RELATED APPLICATION

This application claims the benefit of U.S. patent application Ser. No. 18/425,379 filed Jan. 29, 2024, which claims the benefit of U.S. patent application Ser. No. 17/839,140 filed Jun. 13, 2022, which claims the benefit of U.S. patent application Ser. No. 17/098,554 filed Nov. 16, 2020, which claims the benefit of U.S. patent application Ser. No. 16/134,122 filed Sep. 18, 2018, which claims the benefit of U.S. Provisional Patent Application No. 62/666,781 filed May 4, 2018, and U.S. Provisional Patent Application No. 62/561,254 filed Sep. 21, 2017, the disclosures of which are all incorporated herein by reference in their entirety.

TECHNICAL FIELD

The present disclosure relates to the capture of images based on the use of unmanned aerial vehicles (drones).

BACKGROUND

In recent years, advances in unmanned aerial vehicle (drone) technology have led to an influx of commercially available drones, the majority of which are both relatively affordable and simple to use. The use of drones has been made possible by a number of advancements, related to light weight/high strength materials, improved control and guidance systems, improved speed and reliability of electronics and communications systems, battery life, and the like. Affordable drone technology has enabled a number of new applications for drones. The use of drones in aerial photography is particularly useful in that it enables images to be taken from positions that are not easily accessible to humans.

SUMMARY OF THE DISCLOSURE

For certain applications, a single drone may service multiple users at the same time. Additionally, drones may be used to capture images in inhospitable climates and/or at inconvenient times. The present disclosure teaches how drones may be used to augment and extend the image taking capabilities of individuals. The individuals may be at events, and may be working together to capture images, or together to collectively capture images. Challenges still exist for mass utilization of drone technology, one example being the fluid state of regulatory standards for managing drone airspace.

In one aspect of the present disclosure, capture instructions are provided to a drone device by a server. The capture instructions may be explicitly provided by a user device or may be inferred implicitly by the server based on information collected from the user device. The capture instructions may include information identifying subject faces to be captured, geographical areas in which to capture images, and or temporal information indicating start and/or end times during which to capture images. The images captured by the drone device may be distributed to other devices including the user device.

It is a goal of the present disclosure to facilitate the capturing of images in situations where it is untenable using current technology by improving the functioning of the devices comprising the system including the user device, server device, drone operator device, and drone device.

In one aspect of the present disclosure, the server device receives an image captured by the drone device without making use of capture instructions provided by the server. In this aspect, the drone device may capture images under the control and guidance of the operator device. The server device may distribute the image to devices including a user device. The recipients of information identifying the image may be designated based on user devices in proximity to the image. The proximity may be one or more of geographical proximity, temporal proximity, subject face proximity, and the like.

It is a goal of the present disclosure to facilitate the sharing of images in situations where it is untenable using current technology by improving the functioning of the devices comprising the system including the user device, server device, drone operator device, and drone device.

In one aspect of the present disclosure, the server device receives information on one or more drone devices and stores that information in a drone device registry. The server device makes use of the information stored in the drone device registry to pair other devices, including user device, to a drone device for drone device service. In some respects, the server makes the designation based on information provided in a request from the user device. In some aspects, the server makes the designation by facilitating of allowing the user device to browse through the information in the drone device registry and receive inputs from the user device.

It is a goal of the present disclosure to make drone assisted imaging available at a lower cost while also increasing safety by reducing the number of drones required to provide coverage by improving the functioning of the devices comprising the system including the user device, server device, drone operator device, and drone device.

In one aspect of the present disclosure information is gathered about user interest and that interest (factors-of-interest) is used to provide instructions to the drone as to what should be captured (capture instructions). In a second aspect of the present disclosure the system may identify situations where drone photography may be appropriate, and the drone may capture images to identify users at an event, and seed and event based on that information. In a third aspect of the present disclosure, a drone device registry is provided, and a user may request service from among a plurality of drone devices, and provide control instructions to the drone device.

It is a goal of the present disclosure to improve the functioning of various electronic devices and systems to in turn improve the ability of users to obtain images captured from locations that were not previously possible. In particular, those electronic devices to be improved include the user device, server device, drone operator device, and drone device.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a network interface operable to: couple the server device to a user device, and an operator device over a network; and a processor and a memory coupled to the network interface and operable to: The network interface also includes send, to a drone device, capture instructions. The network interface also includes receive, from the drone device, an image captured by the drone device based on the capture instructions. The network interface also includes send, to the user device, the image. Other embodiments of this aspect include corresponding computer systems, apparatus, and computer programs recorded on one or more computer storage devices, each configured to perform the actions of the methods.

Implementations may include one or more of the following features. The server device where the processor and the memory further are operable to: receive drone device information identifying the drone device. The server device may also include receive user device information identifying the user device. The server device where the drone device information identifying the drone device includes one or more of: owner information, operator information, schedule information. The server device may also include current location information, capability information, pricing policy information. The server device further including: the network interface operable to: The server device may also include couple the server device to the user device, the operator device, and the drone device over the network. The server device where the image received from the drone device is not relayed through the operator device. The server device where the image received from the drone device is relayed through the operator device using a radio link between the drone device and the operator device. The server device where to send the capture instructions to the drone device the processor and the memory further operable to: obtain a plurality of images associated with a sharing pool associated with an event, the user device being a participant of the sharing pool; and analyze the plurality of images to determine the capture instructions, the capture instructions including factors-of-interest including subject faces appearing in the plurality of images. The server device where to send the capture instructions to the drone device the processor and the memory further operable to: determine, from the sharing pool associated with the event, geographical boundary information and temporal boundary information for the event; and include in the capture instructions the geographical boundary information and temporal boundary information. The server device where to send the capture instructions to the drone device the processor and the memory further operable to: receiving, from the user device, information identifying subject faces found in a collection of images stored at the user device; and including, in the capture instructions, the information identifying subject faces found in the collection of images stored at the user device. The server device where to send the capture instructions to the drone device the processor and the memory further operable to: receiving, from the user device, a second image in which one or more subject faces appear; determining information identifying the one or more subject faces found in the second image; and including, in the capture instructions, the information identifying the subject faces found in the second image. The server device where to send the capture instructions to the drone device the processor and the memory further operable to: retrieve social graph information for a user of the user device based on credentials received from the user device; and send, to the drone device, the capture instructions, where the capture instructions include one or more subject faces corresponding to one or more social network users identified from the social graph information. The server device where to send the capture instructions to the drone device the processor and the memory further operable to: determine, from the social graph information, geographical location tracking information enabling the drone device to determine real-time locations of one or more other user devices corresponding to the one or more social network users identified from the social graph information; and include the geographical location tracking information in the capture instructions. The server device where the processor and the memory are further operable to: identify addressing information for one or more other user devices corresponding to one or more subject faces appearing in the image; and send, to the one or more other user devices, the image. The server device where the processor and the memory are further operable to: receive, from the user device, first remuneration; send, in response to receiving the first remuneration from the user device, the image; receive, from a second user device, second remuneration; and send, in response to receiving the second remuneration from the second user device, the image. The server device where to send the capture instructions to the drone device the processor and the memory further operable to: receive, from the user device, first factor-of-interest information and first remuneration policy information; receive, from a second user device, second factor-of-interest information and second remuneration policy information; and determine capture instructions based on first factor-of-interest information, first remuneration policy information, second factor-of-interest information, and second remuneration policy information. The server device where to send the capture instructions to the drone device the processor and the memory further operable to: obtain event information for a plurality of events; determine, based on the event information for the plurality of events, event opportunity scores; designate, based on the event opportunity scores, a designated event of the plurality of events; and assign the drone device to the designated event. The server device where the event information includes subject face information, geographical boundary information and temporal boundary information. The server device where the processor and the memory are further operable to: receive factors-of-interest from the user device; send the factors-of-interest to the drone device; and receive the image, where the image was captured by the drone device based on the factors-of-interest. The server device where the image received from the drone device was captured by the drone device based on factors-of-interest including one or more of: one or more subject faces, one or more geographical area, one or more time periods, one or more event, social graph, and subject tracking information. The server device where remuneration policies include one or more of: contribute images, watch ads, purchase prints, purchase images, join network, tracking information permission, and social graph information. The server device where receiving the image from the drone device includes receiving one or more of: a thumbnail of the image, a compressed version of the image, and a raw version of the image. The server device where receiving the image from the drone device includes receiving one or more of: the image in real-time over the network, the image in batch mode via removable media, and the image in real-time over the network. The server device where the processor and the memory are further operable to: receive a plurality of images, where the first image is one of the plurality of images; and send, to a plurality of user devices, the plurality of images, the plurality of user devices including the user device. The server device the processor and the memory are further operable to: operate a social network. The server device the processor and the memory are further operable to: communicate with a third party social network. The server device where the processor and memory are further operable to: store tracking data for the plurality of user devices; determine one or more user devices of the plurality of user devices in proximity to the first image; and send, to the one or more user devices, the first image. The server device where the processor and memory are further operable to: designate the one or more user devices of the plurality of user devices as in proximity to the first image if it was captured within a specified geographical distance and a specified temporal distance to the first image. The server device where the specified geographical distance is one of ten ft., twenty-five ft., fifty ft., one hundred ft., two hundred ft., five hundred ft., and a one thousand ft. The server device where the specified temporal distance is one of five minutes, fifteen minutes, thirty minutes, one hour, two hours, four hours, eight hours, twelve hours, and twenty four hours. The server device where the first image is not captured based on capture instructions received from the user device. The server device where the first image is captured based on capture instructions received from the user device. The server device where the first image is not captured based on control instructions received from the user device. The server device where the first image is captured based on control instructions received from the user device. The server device where the first image is not captured based on capture instructions provided by the operator device to the drone device. The server device where the first image is captured based on capture instructions provided by the operator device to the drone device. The server device where the first image is not captured based on control instructions provided by the operator device to the drone device. The server device where the first image is captured based on control instructions provided by the operator device to the drone device. The server device where the processor and memory are further operable to: receive, from the operator device, a distribution list of user devices; and send, to the distribution list of user devices, the first image. The server device where the processor and memory are further operable to: receive, from the user device, a distribution list of user devices; and send, to the distribution list of user devices, the first image. The server device where the processor and memory are further operable to: receive, from the user device, information, the information enabling access to a social network graph; and determine, based on the information, a distribution list of user devices send, to the distribution list of user devices, the first image. The server device where the processor and memory are further operable to: associate the first image with a sharing pool; and send, to participants of the sharing pool, the first image. The server device where the processor and memory are further operable to: initiate, based on a request from the user device, a sharing pool. The server device where the processor and memory are further operable to: initiate, based on a request from the user device, a sharing pool. The server device where the processor and memory are further operable to: receive boundary information, the boundary information identifying geographical boundaries of a geo-fence. The server device may also include in response to receiving the first image, determine user devices currently within the geo-fence. The server device may also include send, to the user devices currently within the geo-fence, the first image. The server device where to designate the available drone device the processor and the memory are further operable to: send, to the requesting user device, drone device information for ones of the plurality of drone devices; and receive, from the requesting user device, information indicating the available drone device from the ones of the plurality of drone devices. The server device where the processor and the memory are further operable to: send the drone device information in one of xml and html format. The server device where to designate the available drone device the processor and the memory are further operable to: perform a comparison, by the server device, of the request to the drone device information; and designate, based on the comparison, the available drone device of the plurality of drone devices. The server device where the request includes a current geographic location of the requesting user device and the drone device information includes a current geographic location of the available drone device, the processor and memory further operable to: compare the current geographic location of the requesting user device to the current geographic location of the available drone device. The server device where the processor and the memory are further operable to: add the available drone device to a drone device repository. The server device where the processor and the memory are further operable to: receive, from the requesting user device, control instructions. The server device may also include send, to the designated drone device, the control instructions. The server device where the processor and the memory are further operable to: receive, from the designated drone device, an image captured by the designated drone device based on the control instructions. The server device may also include send, to the requesting user device, the image. The server device where the image received from the designated drone device is relayed through an operator device using a radio link between the designated drone device and the operator device. The server device where the image received from the designated drone device is tagged with information including: altitude of capture. The server device may also include direction of capture. The server device may also include time of capture. The server device may also include date of capture. The server device may also include operator information. The server device may also include owner information. The server device where the processor and the memory are further operable to: receive, from the designated drone device, an image captured by the designated drone device based on the control instructions; store the image at the server; and send, to the requesting user device, information identifying the image. The server device further including: the network interface further operable to: The server device may also include couple the server device to the designated drone device over the network; and the processor and the memory are further operable to: The server device may also include receive the image from the designated drone device. The server device where the image received from the designated drone device is not relayed through an operator device. The server device where the processor and the memory are further operable to: receive, from the requesting user device, tracking instructions; and send, to the designated drone device, the tracking instructions, where the tracking instructions enable the designated drone device to follow a reference position user device as it changes geographic location over time. The server device where capture capabilities include capture resolution, frame rate, and media format. The server device where the request includes start time, geographic location information, and capture capabilities. The server device where drone device information includes communication connection type, communication connection bandwidth, battery life, maximum altitude, minimum altitude, coverage area, flight speed, availability, first information identifying one or more operators, second information identifying one or more owners. The server device where the drone device information identifying the registering drone device includes one or more of: owner information, operator information, schedule information. The server device may also include current location information, capability information, pricing policy information. The server device where the processor and the memory are further operable to: send, to the available drone device, a scheduling request, the scheduling request identifying a time and geographic location. The server device may also include receive, from the available drone device, scheduling confirmation. The server device where in response to receiving the request the processor and the memory are further operable to: send, to user device, a request acknowledgement; commence drone coverage; and send, to user device, commencement acknowledgement. Implementations of the described techniques may include hardware, a method or process, or computer software on a computer-accessible medium.

One general aspect includes a server device including: a network interface operable to: The server device also includes couple the server device to a user device, and an operator device over a network; and a processor and a memory coupled to the network interface and operable to: The server device also includes receive, from a drone device, a first image. The server device also includes designate the user device to receive the first image. The server device also includes send, to the user device, the first image. Other embodiments of this aspect include corresponding computer systems, apparatus, and computer programs recorded on one or more computer storage devices, each configured to perform the actions of the methods.

Implementations may include one or more of the following features. The server device where the processor and the memory are further operable to: receive a plurality of images, where the first image is one of the plurality of images; and send, to a plurality of user devices, the plurality of images, the plurality of user devices including the user device. The server device the processor and the memory are further operable to: operate a social network. The server device the processor and the memory are further operable to: communicate with a third party social network. The server device where the processor and memory are further operable to: store tracking data for the plurality of user devices; determine one or more user devices of the plurality of user devices in proximity to the first image; and send, to the one or more user devices, the first image. The server device where the processor and memory are further operable to: designate the one or more user devices of the plurality of user devices as in proximity to the first image if it was captured within a specified geographical distance and a specified temporal distance to the first image. The server device where the specified geographical distance is one of ten ft., twenty-five ft., fifty ft., one hundred ft., two hundred ft., five hundred ft., and a one thousand ft. The server device where the specified temporal distance is one of five minutes, fifteen minutes, thirty minutes, one hour, two hours, four hours, eight hours, twelve hours, and twenty four hours. The server device where the first image is not captured based on capture instructions received from the user device. The server device where the first image is captured based on capture instructions received from the user device. The server device where the first image is not captured based on control instructions received from the user device. The server device where the first image is captured based on control instructions received from the user device. The server device where the first image is not captured based on capture instructions provided by the operator device to the drone device. The server device where the first image is captured based on capture instructions provided by the operator device to the drone device. The server device where the first image is not captured based on control instructions provided by the operator device to the drone device. The server device where the first image is captured based on control instructions provided by the operator device to the drone device. The server device where the processor and memory are further operable to: receive, from the operator device, a distribution list of user devices; and send, to the distribution list of user devices, the first image. The server device where the processor and memory are further operable to: receive, from the user device, a distribution list of user devices; and send, to the distribution list of user devices, the first image. The server device where the processor and memory are further operable to: receive, from the user device, information, the information enabling access to a social network graph; and determine, based on the information, a distribution list of user devices send, to the distribution list of user devices, the first image. The server device where the processor and memory are further operable to: associate the first image with a sharing pool; and send, to participants of the sharing pool, the first image. The server device where the processor and memory are further operable to: initiate, based on a request from the user device, a sharing pool. The server device where the processor and memory are further operable to: initiate, based on a request from the user device, a sharing pool. The server device where the processor and memory are further operable to: receive boundary information, the boundary information identifying geographical boundaries of a geo-fence. The server device may also include in response to receiving the first image, determine user devices currently within the geo-fence. The server device may also include send, to the user devices currently within the geo-fence, the first image. The server device where to designate the available drone device the processor and the memory are further operable to: send, to the requesting user device, drone device information for ones of the plurality of drone devices; and receive, from the requesting user device, information indicating the available drone device from the ones of the plurality of drone devices. The server device where the processor and the memory are further operable to: send the drone device information in one of xml and html format. The server device where to designate the available drone device the processor and the memory are further operable to: perform a comparison, by the server device, of the request to the drone device information; and designate, based on the comparison, the available drone device of the plurality of drone devices. The server device where the request includes a current geographic location of the requesting user device and the drone device information includes a current geographic location of the available drone device, the processor and memory further operable to: compare the current geographic location of the requesting user device to the current geographic location of the available drone device. The server device where the processor and the memory are further operable to: add the available drone device to a drone device repository. The server device where the processor and the memory are further operable to: receive, from the requesting user device, control instructions. The server device may also include send, to the designated drone device, the control instructions. The server device where the processor and the memory are further operable to: receive, from the designated drone device, an image captured by the designated drone device based on the control instructions. The server device may also include send, to the requesting user device, the image. The server device where the image received from the designated drone device is relayed through an operator device using a radio link between the designated drone device and the operator device. The server device where the image received from the designated drone device is tagged with information including: altitude of capture. The server device may also include direction of capture. The server device may also include time of capture. The server device may also include date of capture. The server device may also include operator information. The server device may also include owner information. The server device where the processor and the memory are further operable to: receive, from the designated drone device, an image captured by the designated drone device based on the control instructions; store the image at the server; and send, to the requesting user device, information identifying the image. The server device further including: the network interface further operable to: The server device may also include couple the server device to the designated drone device over the network; and the processor and the memory are further operable to: The server device may also include receive the image from the designated drone device. The server device where the image received from the designated drone device is not relayed through an operator device. The server device where the processor and the memory are further operable to: receive, from the requesting user device, tracking instructions; and send, to the designated drone device, the tracking instruc- tions, where the tracking instructions enable the designated drone device to follow a reference position user device as it changes geographic location over time. The server device where capture capabilities include capture resolution, frame rate, and media format. The server device where the request includes start time, geographic location information, and capture capabilities. The server device where drone device information includes communication connection type, com- munication connection bandwidth, battery life, maximum altitude, minimum altitude, coverage area, flight speed, availability, first information identifying one or more opera- tors, second information identifying one or more owners. The server device where the drone device information identifying the registering drone device includes one or more of: owner information, operator information, schedule information. The server device may also include current location information, capability information, pricing policy information. The server device where the processor and the memory are further operable to: send, to the available drone device, a scheduling request, the scheduling request identi- fying a time and geographic location. The server device may also include receive, from the available drone device, sched- uling confirmation. The server device where in response to receiving the request the processor and the memory are further operable to: send, to user device, a request acknowl- edgement; commence drone coverage; and send, to user device, commencement acknowledgement. Implementa- tions of the described techniques may include hardware, a method or process, or computer software on a computer- accessible medium.

One general aspect includes a server device including: a network interface operable to: The server device also includes couple the server device to a plurality of user devices and a plurality of operator devices over a network; and a processor and a memory coupled to the network interface and operable to: for a plurality of drone devices: The server device also includes receive drone device infor- mation for a registering drone device of the plurality of drone devices. The server device also includes register, at the server device, the registering drone device of the plu- rality of drone devices based on the drone device informa- tion. The server device also includes receive, from a requesting user device of the plurality of user devices, a request for drone service from an available drone device of the plurality of drone devices. The server device also includes designate the available drone device of the plurality of drone devices as a designated drone device of the plurality of drone devices. The server device also includes assign the desig- nated drone device of the plurality of drone devices to provide drone service to the requesting user device. Other embodiments of this aspect include corresponding computer systems, apparatus, and computer programs recorded on one or more computer storage devices, each configured to per- form the actions of the methods.

Implementations may include one or more of the follow- ing features. The server device where to designate the available drone device the processor and the memory are further operable to: send, to the requesting user device, drone device information for ones of the plurality of drone devices; and receive, from the requesting user device, infor- mation indicating the available drone device from the ones of the plurality of drone devices. The server device where the processor and the memory are further operable to: send the drone device information in one of xml and html format. The server device where to designate the available drone device the processor and the memory are further operable to: perform a comparison, by the server device, of the request to the drone device information; and designate, based on the comparison, the available drone device of the plurality of drone devices. The server device where the request includes a current geographic location of the requesting user device and the drone device information includes a current geo- graphic location of the available drone device, the processor and memory further operable to: compare the current geo- graphic location of the requesting user device to the current geographic location of the available drone device. The server device where the processor and the memory are further operable to: add the available drone device to a drone device repository. The server device where the processor and the memory are further operable to: receive, from the requesting user device, control instructions. The server device may also include send, to the designated drone device, the control instructions. The server device where the processor and the memory are further operable to: receive, from the designated drone device, an image captured by the designated drone device based on the control instructions. The server device may also include send, to the requesting user device, the image. The server device where the image received from the designated drone device is relayed through an operator device using a radio link between the designated drone device and the operator device. The server device where the image received from the designated drone device is tagged with information including: altitude of capture. The server device may also include direction of capture. The server device may also include time of capture. The server device may also include date of capture. The server device may also include operator information. The server device may also include owner information. The server device where the processor and the memory are further operable to: receive, from the designated drone device, an image captured by the designated drone device based on the control instructions; store the image at the server; and send, to the requesting user device, information identifying the image. The server device further including: the network interface further operable to: The server device may also include couple the server device to the designated drone device over the network; and the processor and the memory are further operable to: The server device may also include receive the image from the designated drone device. The server device where the image received from the designated drone device is not relayed through an operator device. The server device where the processor and the memory are further operable to: receive, from the requesting user device, tracking instructions; and send, to the designated drone device, the tracking instructions, where the tracking instructions enable the designated drone device to follow a reference position user device as it changes geographic location over time. The server device where capture capabilities include capture resolution, frame rate, and media format. The server device where the request includes start time, geographic location information, and capture capabilities. The server device where drone device information includes communication connection type, communication connection bandwidth, battery life, maximum altitude, minimum altitude, coverage area, flight speed, availability, first information identifying one or more operators, second information identifying one or more owners. The server device where the drone device information identifying the registering drone device includes one or more of: owner information, operator information, schedule information. The server device may also include current location information, capability information, pricing policy information. The server device where the processor and the memory are further operable to: send, to the available drone device, a scheduling request, the scheduling request identifying a time and geographic location. The server device may also include receive, from the available drone device, scheduling confirmation. The server device where in response to receiving the request the processor and the memory are further operable to: send, to user device, a request acknowledgement; commence drone coverage; and send, to user device, commencement acknowledgement. Implementations of the described techniques may include hardware, a method or process, or computer software on a computer-accessible medium.

One general aspect includes a server device including: a network interface operable to: The server device also includes couple the server device to a plurality of user devices and a plurality of operator devices over a network; and a processor and a memory coupled to the network interface and operable to: The server device also includes register a plurality of drone devices; receive, from a first user device of the plurality of user devices, a request for drone service from a first drone device of the plurality of drone devices; and assign a designated drone device of the plurality of drone devices to provide drone service to the first user device. Other embodiments of this aspect include corresponding computer systems, apparatus, and computer programs recorded on one or more computer storage devices, each configured to perform the actions of the methods.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1B illustrates a block diagram for an exemplary social network server;

FIG. 1C illustrates an exemplary data structure for representing drone device information;

FIG. 1G illustrates an exemplary data structure for representing remuneration policy information;

FIG. 1H illustrates an exemplary data structure for representing image metadata;

FIG. 2C illustrates a network diagram for operating the system of FIG. 1A and describes the transfer of image data employing a removal storage medium;

FIG. 3 illustrates a network diagram for operating of drone imaging where the drone device captures images based on the faces appearing in images contained in a sharing pool;

FIG. 5B illustrates an exemplary computation for determining capture priority scores;

FIG. 7 illustrates a network diagram for operating drone imaging where the server device distributes captured images based on information derived from the captured images;

DETAILED DESCRIPTION

Figure 1A:
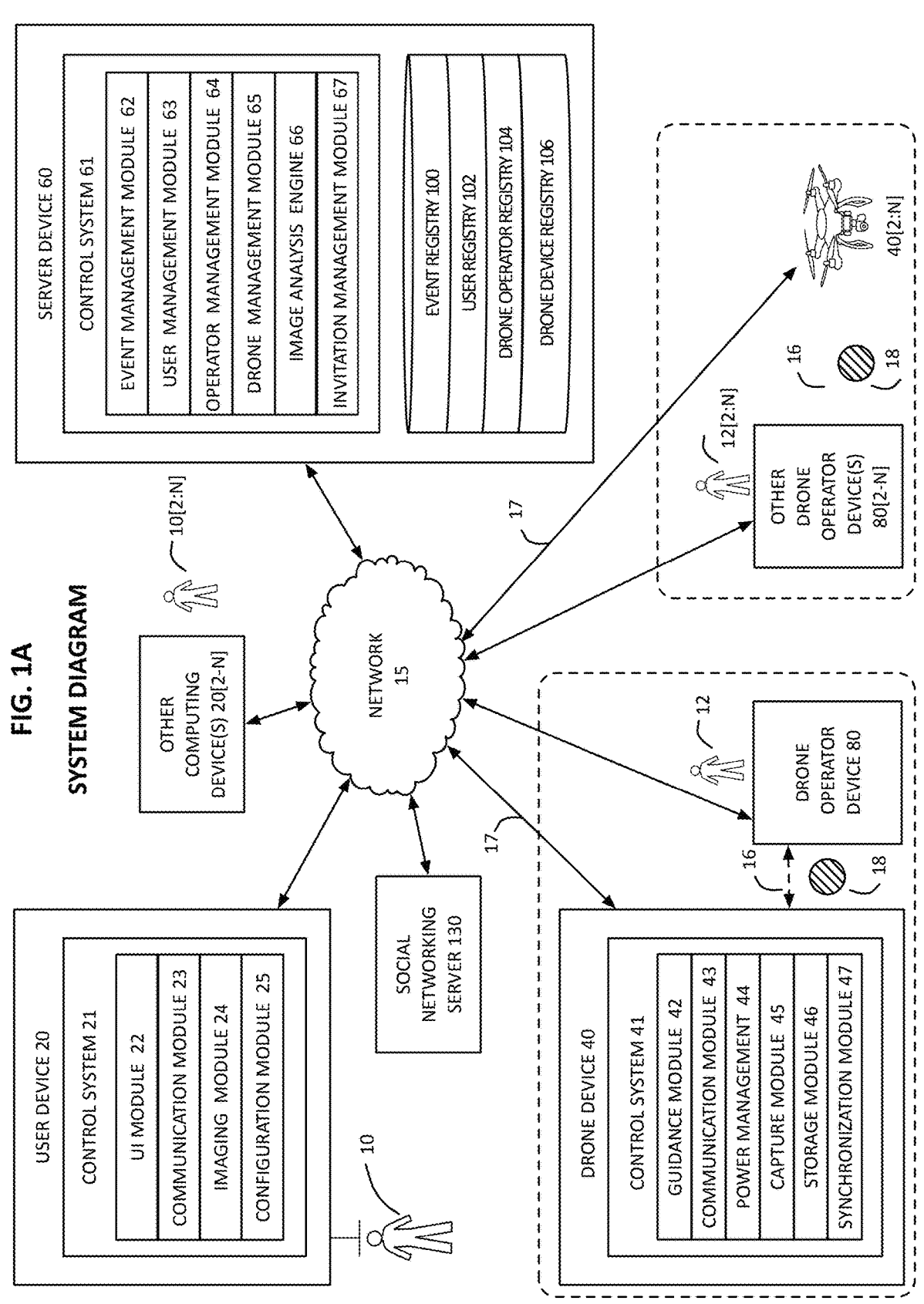
FIG. 1A illustrates an exemplary system for drone assisted image capture.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "user device" and "drone operator device" should be broadly construed. It can include any type of mobile device, for example, a smart phone, a cell phone, a pager, a personal digital assistant (PDA, e.g., with GPRS NIC), a mobile computer with a cellular radio, or the like. A typical mobile device is a wireless data access-enabled device (e.g., an iPHONE® smart phone, a BLACK-BERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable device with the necessary characteristics and capabilities.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Operating environments in which embodiments of the present disclosure may be implemented are also well-known. In a representative embodiment, a user device 20 (shown in FIG. 1A for example), such as a mobile device, is connectable to a transmission functionality that varies depending on implementation. Thus, for example, where the operating environment is a wide area wireless network (e.g., a 2.5G network, a 3G network, a 4G network, or a 5G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, usually a subscriber to the wireless network. Typically, a mobile device is a 2.5G-compliant device, 3G-compliant device, 4G-compliant device, or 5G-compliant device) that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The mobile device may also include a memory or data store.

FIG. 1A shows a system diagram for operating a drone according to some embodiments. In these embodiments, the system is comprised of a user device 20, drone device 40, a server device 60, drone operator device 80 and a network 15. The drone device 40 and the drone operator device 80 also communicate over a separate radio link 16. A removable storage medium 18 may be used to move images from the drone device 40 to the drone operator device 80.

The drone device communicates to the rest of the system through three channels, a network connection 15—which is often implemented as TCP/IP, a radio link 16, and a removable storage medium 18. The three channels may be used in any combination, but one of either the network connection 15 or radio link 16 must be present.

The user device 20 is comprised of a control system 21, UI module 22, communication module 23, imaging module 24 and configuration module 25. The control system 21 is described in FIG. 15. The UI module 22 operates to facilitate interactions between the user of the user device 20 and the hardware and software of the user device 20. The communication module 23 facilitates communications between the user device 20 and other devices connected through the network 15, such as the drone device 40 and the server device 60. The imaging module 24 handles the capture and storage of images. The configuration module 25 facilitates configurations of the user device in some embodiments of the present disclosure. The user device 20 is operated by the user 10.

The drone device 40 is comprised of a control system 41, guidance module 42, communication module 43, power management module 44, capture module 45 storage module 46 and a synchronization module 47. The control system 41 is described in FIG. 16. The guidance module 42 operates to fly the drone device in a plurality of operating modes. The communication module 43 provides one or more communication channels for the drone device including wide area communication over the Internet, IP connectivity over local area networks, and RF communications between the drone device and the drone operator device 80. The power management module 44 monitors and controls the power usage and battery level of the battery supplying power to the drone device 40. The capture module 45 handles the capture and storage of images at the drone device 40. The storage module 46 handles the storage of images captured at the drone device 40. The synchronization module 47 handles the transmission of reduced resolution and full resolution images from the drone device 40 to the server device 60 either directly or indirectly through the drone operator device 80.

The server device 60 is comprised of a control system 61, event management module 62, user management module 63, drone management module 64, image analysis engine 65 and invitation management module 66. The control system 61 is described in FIG. 17. The event management module 62 operates to store information related to one or more image sharing events in the event registry 100. Information stored in the event registry for each event may include associated sharing pool information wherein the sharing pool information may include pool name, pool id, pool type, pool description, pool moderator, pool invitees, pool participants, pool subjects, pool initiation policies, pool termination policies, pool notifications, pool images, and pool tags. Image sharing events and sharing pools are further described in U.S. patent application Ser. No. 14/574,513, entitled METHODS FOR SHARING IMAGES CAPTURED AT AN EVENT, filed on Dec. 18, 2014, currently pending, which is hereby incorporated by reference in its entirety. As used herein, the term "event" refers to the real-world gathering of individuals characterized by geographic location, time, and participants among other things. As used herein, the term "sharing pool refers" to the electronic embodiment of an event including amount other things the fields and parameters characterizing the event.

The user management module 63 operates to store information related to one or more users in the user registry 102. Information stored in the user registry for each user may include: profile information, user devices associated with the user, credentials for interfacing with one or more social networks with which the user has an account, images captured by the user, factors of interest associated with the user, etc. The operator management module 64 operates to store information related to one or more drone operators in the drone operator registry 106. Information stored in the drone operator registry 106 for each drone operator may include: name, geographic location, availability schedule, associated drone devices, experience level, credentials, etc. The drone management module 65 operates to store information related to one or more drone devices in the drone device registry 106. Information stored in the drone device registry 106 for each drone device are described in FIG. 1C. The image analysis engine 66 operates to provide image functions such as compression, filtering, storage, auto correction, tagging, facial recognition, object recognition, etc. The invitation management module 67 handles the creation, transmission, and acknowledgement reception of invitations to events. In various embodiments, the aforementioned registries (100, 102, 104, 106) may be stored as xml in the file system, records in a database, elements in a blockchain, or any combination thereof.

The drone operator device 80 is operated by the drone operator 12. The drone operator 12 launches and provides control of the drone device 40 while the drone device 40 is being manually positioned.

Those of ordinary skill in the art will appreciate that the network 15 is not limited by the implementations listed above. More specifically, the network 15 may be any type of network suitable to allow interaction between the user devices 20, drone operator devices 80 and the server devices 60. For example, the network 15 may be a wired network, a wireless network, or any combination thereof. Further, the network 15 may include a distributed computing network, an intranet, a local-area network (LAN) and/or a wide-area network (WAN), or any combination thereof.

The removable storage medium 18 may be one or more of a Compact Flash card, Secure Digital Card, Memory Stick, and the like.

In some embodiments, the server device 60 may communicate with the drone operator device through the network and the drone operator device 80 communicates with the drone device 40 using the radio link 16. In some embodiments, the drone operator device 80 may serve as a pass through to pass data or commands back and forth from the server device 60 to the drone device 40.

As used herein, the term "social network" refers to a server device that enables client devices associated with users to create and store electronic friend relationship information. Those friend relationships may be symmetric in that one user invites another user to connect (or link), and the other user must accept the electronic invitation before the symmetric friend relationship is created and stored by the server device. The friend relationships may also be asymmetric in that one user may request to follow another user, and the other user need not accept before the asymmetric friend relationship is created and stored by the server device. In some embodiments, the server device may be operable to support both symmetric and asymmetric friend relationships. Examples of server devices that should not be considered social networks are e-mail systems and trust networks. With e-mail, all you need is someone e-mail address to be able to communicate with them and friending is not required. Trust networks typically operate on inference engines where trust is inferred by actions taken by the various users who need not be connected as friends. A server device may be both a social network and a trust network, but just by being one, does not automatically make it the other. An example of a trust network is a news site that enables visitors to comment on articles. Visitors that often contribute valuable comments are awarded a high trust rating. Visitors who contribute off topic comments laced with profanity are awarded a low trust rating.

As used herein, the term "social graph" refers to the electronic friend connections stored by the server device. In some embodiments, this information may be available for export by the server device, such as is the case with Facebook Connect.

As used herein, the term "social distance" refers to the number of hops in the social graph to get from one user to another user. So, the social distance between two friends is one. The social distance between a user and a friend of a friend of a friend is three.

Referring now to FIG. 1B, a block diagram for an exemplary social network server 130. The exemplary social network server 130 is comprised of invitation/follow handler 131, graph export handler 132 and user accounts 133. The invitation/follow handler 131 facilitates the invitation and acceptance signaling required for symmetric friend link 135 creation as well as the signaling required for asymmetric friend link 136 creation. The graph export handler 132 facilitates access to social graph information 134 by external entities. The social network server 130 may also store location history information 137 including facilitating access to user's current geographical location. The user's current geographical location is typically automatically determined and periodically updated without user action beyond possible initial configuration input. However, in some cases, when automatic geographical location cannot be determined, the user may enter this information in directly, typically by choosing a point on a graphical map displayed on the user device 20.

In some embodiments, the social network server 130 is deployed separately and controlled by another entity distinct from the server device 60, and the social network server provides services and data to the server device to achieve the desired results. In some embodiments, the social network server 130 and the server device 60 are operated together by the same entity.

FIG. 1C illustrates an exemplary data structure for representing drone device information 140. This information is provided by the drone device 40 and/or the drone operator device 80. It is stored in the drone device registry 106, and may be updated periodically.

| DRONE DEVICE INFORMATION | DESCRIPTION |
|---|---|
| Drone Device Identifier 141 | A unique machine identifier for the drone device. |
| Owner Information 142 | Identifies one or more owners of the drone device. This may or may not be the same as the drone operator 12. |
| Operator Information 143 | Identifies one or more drone operators of the drone device. |
| Schedule Information 144 | Identifies time periods during which the drone is already scheduled, time periods for when the drone device is available, and time periods where the drone device is not available for scheduling. |
| Current Location 145 | Identifies the current geographical location for the drone device if the status of the drone device indicates that it is currently operating. |
| Capture Capability 146 | Identifies items such as the capture resolution, capture rate, capture format, etc. |
| Pricing Information 147 | Identifies remuneration types accepted, corresponding rates, and services available |
| Restrictions 148 | Identifies flight restrictions such as maximum height, min height, coverage range, maximum flight time, etc. |
| Status 149 | Identifies the current status of the drone device, such as operating and offline. |

Figures 1D, 1E, 1F:
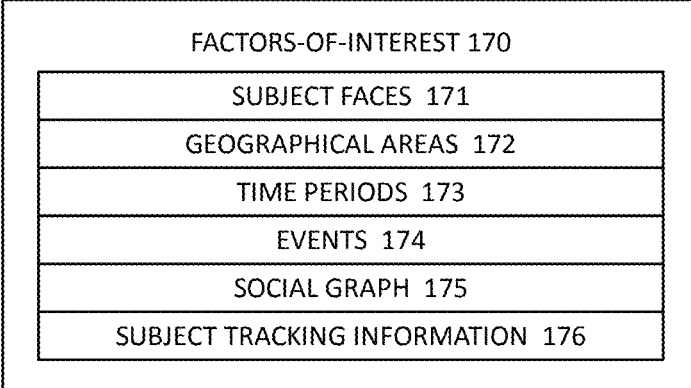
FIG. 1D illustrates an exemplary data structure for representing control instructions.
FIG. 1E illustrates an exemplary data structure for representing capture instructions.
FIG. 1F illustrates an exemplary data structure for representing factor-of-interest information.

FIG. 1D illustrates an exemplary data structure for representing drone control instructions 150. In some embodiments of the present disclosure, a user device 20 may control a drone device 40 directly and send control instructions 150 to the drone device 40 through the server device. In some embodiments, the control instructions 150 are transmitted through the drone operator device 80 and may be modified by the drone operator device 80 prior to delivery to the drone device 40. For example, as a safety precaution, if the user device 20 is attempting to operate the drone device 40 in an unsafe manner (such as too close to the event action or too close to a landmark), then the drone operator device 80 may take control and/or alter/or override the control instructions 150.

| CONTROL INSTRUCTIONS | DESCRIPTION |
|---|---|
| Position Hold 151 | Instruct the drone device to hold current GPS position. |
| Return Home 152 | Instruct drone device to return to the GPS location associated with the drone's home location. |
| Autonomous Flight 153 | Instruct drone device to proceed along a provided series of GPS waypoints. |
| Track Subject 154 | Instruct drone device to tract a certain subject (face or tracking info). |

-continued

| CONTROL INSTRUCTIONS | DESCRIPTION |
|---|---|
| Capture 155 | Instruct drone device to take a picture. |
| Position Camera 156 | Instruct drone device to move to a specified location. |

FIG. 1E illustrates an exemplary data structure for representing capture instructions 160.

| CAPTURE INSTRUCTIONS | DESCRIPTION |
|---|---|
| Factors-of-Interest 170 | Refers to the factors-of-interest 170 structure below. |
| Remuneration Policy 180 | Refers to the remuneration policy information 180 structure below. |

FIG. 1F illustrates an exemplary data structure for representing factor-of-interest information 170. This information may be explicitly received via user input at a user device 20, or implicitly inferred from user behaviors, preferences, geographic location history, etc. For example, in some embodiments, a user device 20 will take an image comprising factors-of-interest and send it to the server device 60. Based on the received image, the server device 60 will isolate the factors-of-interest and send them to the drone device 40. In some embodiments, the user device 20 will determine the factors-of-interest and send them to the server device 40. In some embodiments, the user device will enable the user of the user device 20 to input the factors-of-interest explicitly, and those will be sent to the server device drone device 40.

| FACTOR OF INTEREST | DESCRIPTION |
|---|---|
| Subject Faces 171 | Information identifying the face of a subject, a subject being any person including a drone device operator 12 or user device owner 10. This information may be used by the drone to employ facial recognition to identify and track users. |
| Geographical Areas 172 | Information identifying a geographical area. For example, the boundaries of an event. This information may be used by the drone for positioning purposes. |
| Times Period 173 | Information identifying a temporal period. For example, the start and end times of an event. This information may be used by the drone for determining when to take images and for scheduling purposes. |
| Events 174 | Information identifying a planned public or social occasion such as a sporting event, concert event and the like. |
| Social Graph 175 | Information available from a social network (social graph information 134), for example through Facebook Connect. This information may be used to extract Subject Face 171 information for one or more friends of a user, which in turn may be provided to the drone for use in facial recognition and user tracking. |
| Subject Tracking Information 176 | Information allowing the geographical location tracking of a subject. This may include the current geographical location of a user. This is used by a drone to identify the location of a user so an image may be captured. |

FIG. 1G illustrates an exemplary data structure for representing remuneration information policy information 180. The table below describes a plurality of remuneration policies. The user 10 may agree to one or more of the policies (i.e. they may be used alone or in any combination).

| REMUNERATION POLICY INFORMATION | DESCRIPTION |
|---|---|
| Contribute Images 181 | User 10 agrees to contribute one or images to a sharing pool associated with the images captured by the drone device 40 in exchange for access to the image(s) captured by the drone device 40. |
| Watch Ads 182 | User 10 agrees to watch ads in exchange for access to the image(s) captured by the drone device 40. |
| Purchase Prints 183 | User 10 agrees to use fulfillment services identified by drone device 40 in exchange for access to the image(s) captured by the drone device 40. |
| Purchase Images 184 | User 10 agrees to purchase one or more images captured by drone device 40 in exchange for access to the image(s) captured by the drone device 40. |
| Join Network 185 | User 10 creates an account, providing contact information, and agrees to receive notifications (e-mails for example) in exchange for access to the image(s) captured by the drone device 40. |
| Tracking Information Permissions 186 | User 10 agrees to let server device 60 access geographic location tracking information 176 of the user in exchange for access to the image(s) captured by the drone device 40. |
| Social Graph Information Permissions 187 | User 10 agrees to let server device 60 access social graph information 134 of the user in exchange for access to the image(s) captured by the drone device 40. |

FIG. 1H illustrates an exemplary data structure for representing image metadata 190.

| IMAGE METADATA | DESCRIPTION |
|---|---|
| Time 191 | Time indicates the time at which the image was captured and is stored by the capture device. |
| Date 192 | Date indicates the date at which the image was captured and is stored by the capture device. |
| Geographic Location 193 | Geographical location indicates the location at which the image was captured and is stored by the capture device. The geographical location is typically stored as GPS coordinates, but may be stored in other formats such as What3Words and the like. The geographical location may be determined from cell tower triangulation, WIFI network triangulation, GPS, or any combination thereof. |
| Camera Make 194 | The make of the camera that captured the image. |
| Camera Model 195 | The model of the camera that captured the image. |
| Capture Settings 196 | The camera settings at the time the image was capture. camera settings typically include aperture, exposure, shutter speed, focus mode, etc. |
| Altitude 197 | The height at which the camera was when the image was capture in relation to a base level. Sea level is typically used as a base level. |
| Compass Direction 198 | The direction at which the camera was pointed when the image was captured. Typically in units of milliradians. |

While the system described herein has been described in terms of capturing still images, it will be apparent to one of ordinary skill that most of the principals described herein would apply to audio and video as well as thus should be considered within the scope of this application. In another aspect of the following disclosure, the principals are applied to key frames extracted from a video capture steam.

Figure 2A:
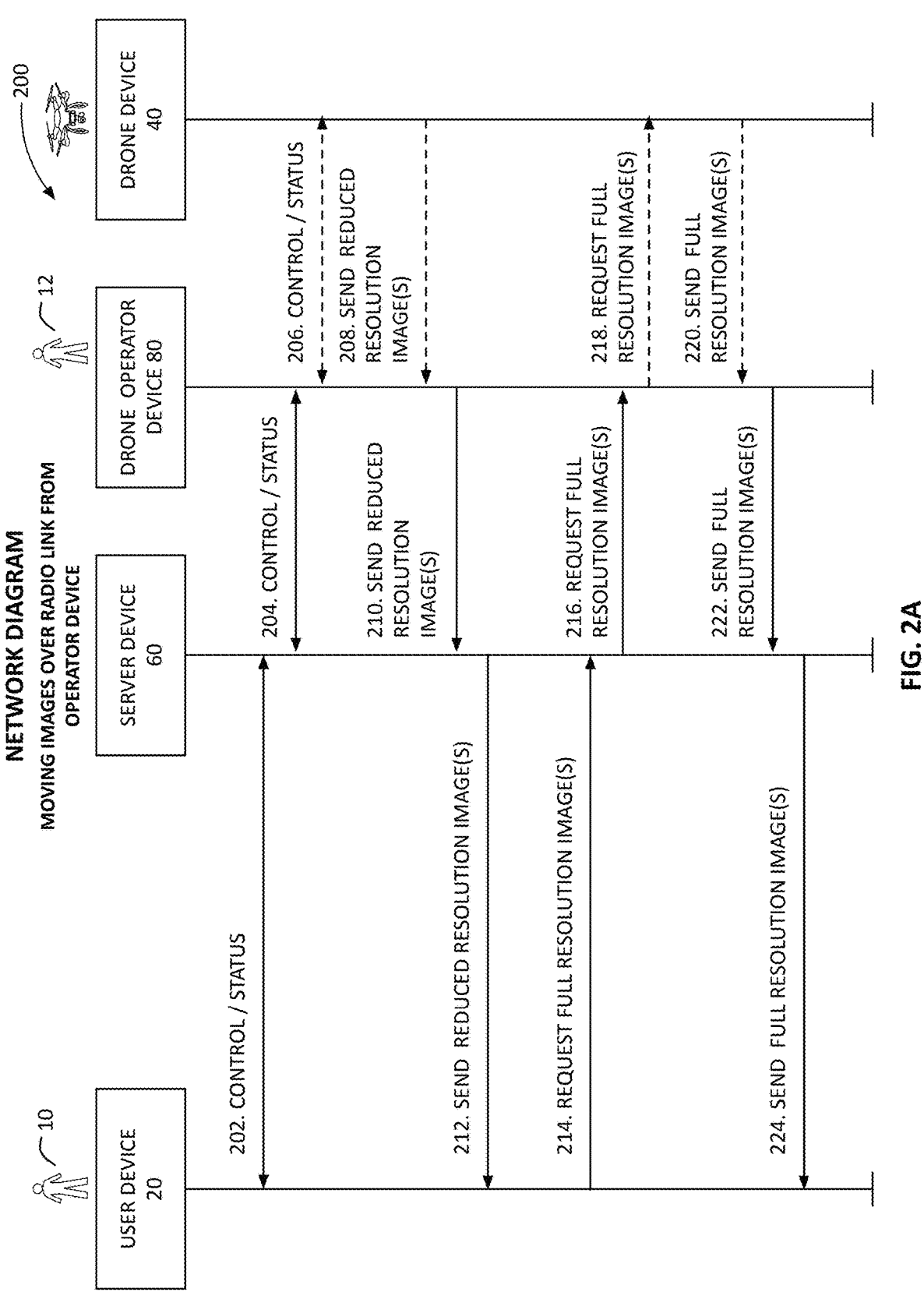
FIG. 2A illustrates a network diagram for operating the system of FIG. 1A and describes the transfer of image data a radio link.

FIG. 2A illustrates a network diagram 200 for operating the system of FIG. 1A and describes the transfer of image data over the radio link 16. Control and status messages are sent 202 between the user device 20 and server device 60 over the network 15. Control and status messages are sent 204 between the server device 60 and drone operator device 80. Control and status messages are sent 206 between the drone operator device 80 and drone device 40 over the radio link 16. Upon capture of images at the drone device 40, image data is sent from the drone device 40. In some embodiments, reduced resolution images are sent first to provide more timely feedback. For example, reduced resolution images are sent 208 from the drone device 40 to the drone operator device 80 over the radio link 16. The reduced resolution images are then sent 210 from the drone operator device 80 to the server device 60 over the network 15. The reduced resolution images are then sent 212 from the server device 60 to the user device over the network 15. In some embodiments, based on input received from the user 10, the user device 20 may request 214 full resolution images from the server device 60 over the network 15. The server device 60 may then relay 216 the request to the drone operator device 80 over the network 15. The drone operator device 80 may then relay 218 the request to the drone device 40 over the radio link 16. In response, the drone device 40 may send 220 full resolution images to the drone operator device 80 over the radio link 16. The full resolution images are then sent 222 from the drone operator device 80 over the network 15 to the server device 60 and forwarded 224 to the user device 20 over the network 15. In some embodiments, only full resolution images are sent. In some embodiments, images, either reduced or full resolution are sent without being requested. In some embodiments, images, either reduced or full resolution are sent only when requested. In some embodiments, information identifying an address where the images may be retrieved is sent instead of the images, and the recipient of the address may retrieve the image data at the indicated address. Images may be transferred individually or in batches.

Figure 2B:
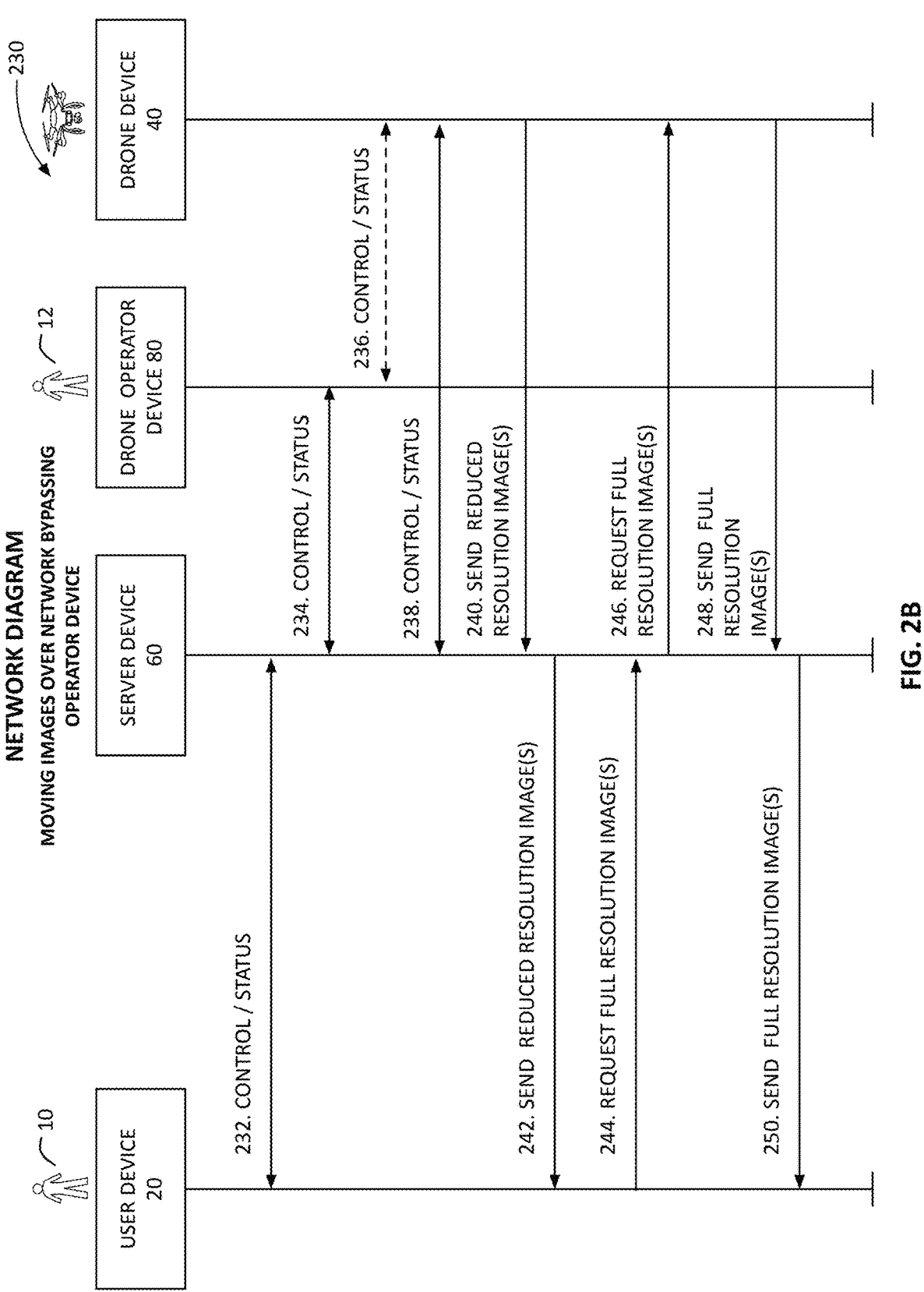
FIG. 2B illustrates a network diagram for operating the system of FIG. 1A and describes the transfer of image data over a network.

FIG. 2B illustrates a network diagram 230 for operating the system of FIG. 1A and describes the transfer of image data over the network 15. In the embodiment described in FIG. 2B, the server device 60 is coupled to the drone device 40 directly over the network 15, and indirectly through the drone operator device 80 over the radio link 16. As a result, In FIG. 1A, the drone device may provide image information over the radio link 16 as in FIG. 2A, but also over the network as described in FIG. 2B. Control and status messages are sent 232 between the user device 20 and server device 60 over the network 15. Control and status messages are sent 234 between the server device 60 and drone operator device 80 over the network 15. Control and status messages are sent 236 between the drone operator device 80 and drone device 40 over the radio link 16. Control and status messages are sent 238 between the server device 60 and drone device 40 over the network 15. In some embodiments, reduced resolution images are sent first to provide more timely feedback. For example, reduced resolution images are sent 240 from the drone device 40 to the server device 60 over the network 15. The reduced resolution images are then sent 242 from the server device 60 to the user device 20 over the network 15. In some embodiments, based on input received from the user 10, the user device 20 may request 244 full resolution images from the server device 60 over the network 15. The server device 60 may then relay 246 the request to the drone device 40 over the network 15. In response, the drone device 40 may send 248 full resolution images to the server device 60 over the network 15, which are then forwarded 250 to the user device 20 over the network 15. In some embodiments, only full resolution images are sent. In some embodiments, images, either reduced or full resolution are sent without being requested. In some embodiments, images, either reduced or full resolution are sent only when requested. In some embodiments, information identifying an address where the images may be retrieved is sent instead of the images, and the recipient of the address may retrieve the image data at the indicated address. Images may be transferred individually or in batches.

FIG. 2C illustrates a network diagram 260 for operating the system of FIG. 1A and describes the transfer of image data employing a removal storage medium. According to FIG. 2C, image data is transferred 268 from the drone device 40 by the drone operator 12 to the drone operator device 80 using the removable storage medium 18. Reduced resolution may be sent 270 from the drone operator device 80 to the server device 60 over the network 15 and relayed 272 to the user device 20 by the server device 60 over the network 15. In some embodiments, based on input received from the user 10, the user device 20 may request 274 full resolution images from the server device 60 over the network 15, and the request may be relayed 276 from the server device 60 over the network 15 to the drone operator device 80. In response, full resolution images may be sent 278 to the server device 60 over the network 15 and relayed 280 from the server device 60 to the user device 20. In some embodiments, only full resolution images are sent. In some embodiments, images, either reduced or full resolution are sent without being requested. In some embodiments, images, either reduced or full resolution are sent only when requested. In some embodiments, information identifying an address where the images may be retrieved is sent instead of the images, and the recipient of the address may retrieve the image data at the indicated address. Images may be transferred individually or in batches.

FIG. 3 illustrates a network diagram 300 for a scenario where a drone device is instructed to capture images found in an existing sharing pool. Referring now to FIG. 3, the user device 20 captures a first plurality of images 301 which are sent 302 to the server device 60. In some embodiments, the server device 60 will form 304 a sharing pool around the first plurality of images, or if a sharing pool already exists, it will add the first plurality of images to the existing sharing pool. The server device 60 will analyze 306 the first plurality of images to determine factors-of-interest. Factors-of-interest may include subject faces, geographical locations, subject tracking information, user tracking information, etc. These factors-of-interest are sent 308 to a drone device 40. In some embodiments, the drone device 40 operates independently to capture 309 images based on the factors-of-interest. In some embodiments, the factors-of-interest are made available to a drone operator device 80, and the drone operator device 80 guides the drone device 40 through the capture process. In some embodiments, it is a combination of the drone device 40 operating independently at times, and at other times the drone operator device 80 is controlling or guiding the drone device 40. The second plurality of images are sent 310 to the server device 40. One or more of the second plurality of images are sent 312 to the user device 20.

As used herein, the term "subject" refers to a person who may or may not be a user 10 of the system. A subject is typically a person who appears in an image or has been identified for capture. As used herein, the term "subject face" refers to the face of the subject.

In some embodiments, the factors-of-interest will be sent directly to the drone device 40 and not through the drone operator device 80. The drone operator device 80 will operate the drone device 40 to capture images in accordance with the information and directions received from the server device 60.

In some embodiments, a drone device 40 will take an image comprising factors-of-interest and send it to the server device 60. Based on the received image, the server device 60 will isolate the factors-of-interest and send them to the drone device 40. In some embodiments, the drone device 40 will determine the factors-of-interest and send them to the server device 60. In some embodiments, the drone device 40 will enable the user 12 of the drone device 40 to input the factors-of-interest explicitly, and those will be sent to the server device 60.

Figure 4:
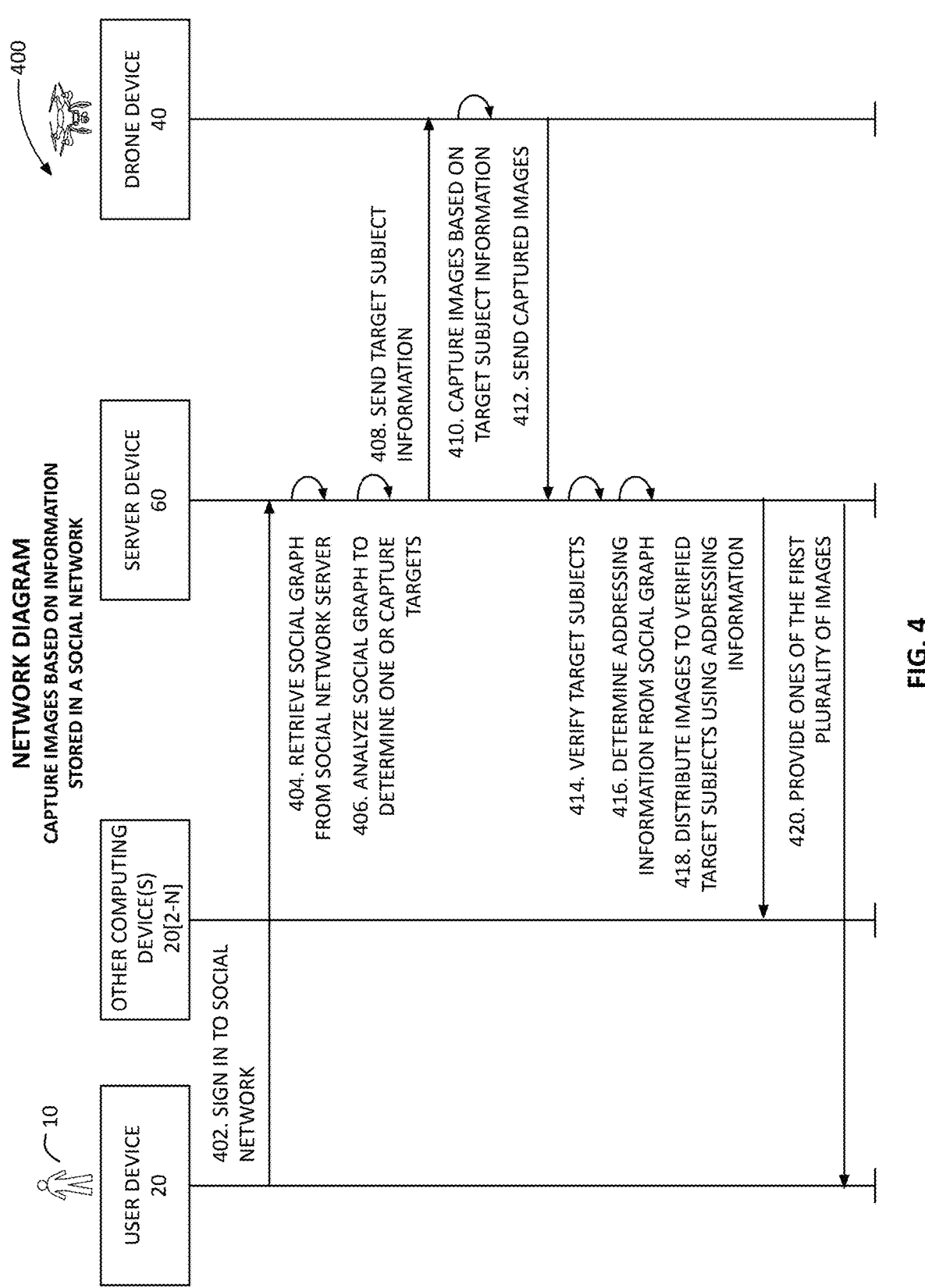
FIG. 4 illustrates a network diagram for operating drone imaging where the drone device captures images based on information stored in a social network.

FIG. 4 illustrates a network diagram 400 for a scenario where a drone device 40 is instructed to capture images based on identifying targets from a social network. Referring now to FIG. 4, the user device 20 signs 402 into the server device 60 which also operates as or in conjunction with a social networking service. Based on inputs received from the user 10, the user device 20 also grants permission to the server device 60 to retrieve 404 information from the social network server 130 such as social graph information 134. The server device 60 analyzes 406 the social graph information 134 to determine capture target subjects. The target subject information is sent 408 to the drone device 40. The drone captures 410 images based on the target subject information. The captured images are sent 412 to the server device 60. Using the social graph information 134, the images are analyzed to verify 414 that they contain target subjects. The server device 60 analyzes 416 the social graph to match up addresses for the subjects with images in which they appear. The images are distributed 418 to the user 10 and or the user's friends 10[2:N]. In some embodiments, ones of the plurality of images 420 are provided to the user 10. In some embodiments, ones of the plurality of images are sent to ones of the plurality of the user's friends. In some embodiments, ones of the plurality of images are sent to subjects that appear in at least one of the captured images. In some embodiments, subjects are only sent the images in which they appear.

In some embodiments, user devices 20 provide factors-of-interest information and remuneration policy information. The factors-of-interest may include subject faces, geographic locations, timing information, subject identifiers, etc. The remuneration policy information is used to identify the remuneration the user 10 is prepared to offer in exchange for the drone device 40 capturing images meeting their factors-of-interest information. Based on this information, the server device 40 prioritizes the images that will be captured by the drone device 40. For example, a user may provide a subject face as factors-of-interest information and a price which they are willing to pay for images meeting the factors-of-interest information.

Figure 5A:
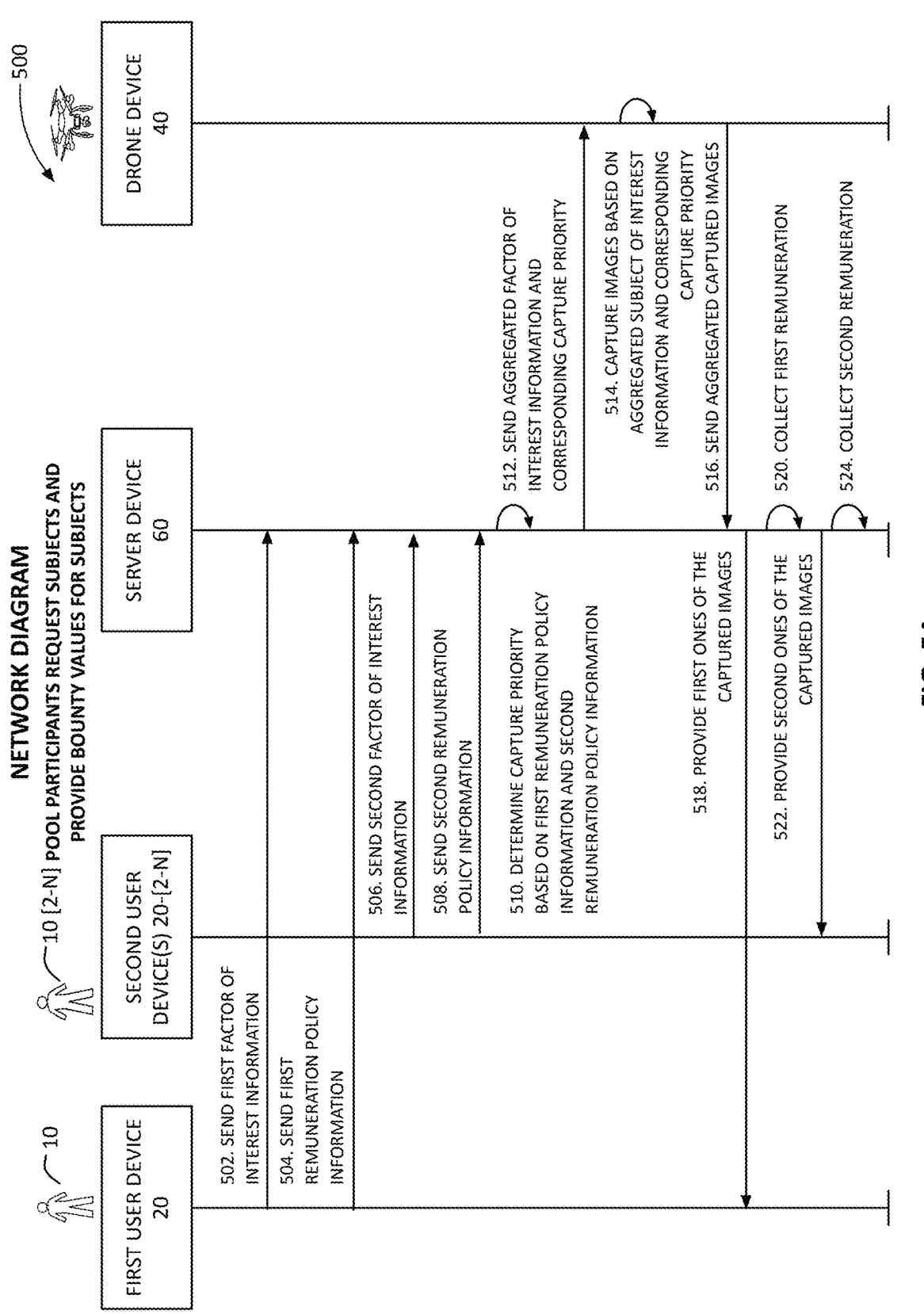
FIG. 5A illustrates a network diagram for operating drone imaging where the server device determines image capture priorities for the drone device based on requests received from user devices.

FIG. 5A illustrates a network diagram 500 for a scenario where a drone device is instructed to capture images based on remuneration policy information. In other words, the drone device 40, under the guidance of the server device 60, attempts to maximize a financial outcome of operating the drone by capturing a group of images that are likely to generate the most financial gain within an event. Referring now to FIG. 5, a first user device 20-1 sends 502 first factor-of-interest information and sends 504 first remuneration policy information to the server device 60. A second user device 20-2 sends 506 second factor-of-interest information and sends 508 second remuneration policy information to the server device 60. The server device 60 determines

510 capture priorities based on the first remuneration policy and the second remuneration policy. Aggregate factor-of-interest information and corresponding capture priorities are sent to the drone device 40. The drone device 40 captures 514 images based on the aggregate factor-of-interest information and corresponding capture priorities. The captured images are sent 516 to the server device 60. First ones of the captured images are sent 518 to the first user device 20-1, and first remuneration is collected 520 at the server device 60. Second ones of the captured images are sent 522 to the second user device 20-1, and second remuneration is collected 524 at the server device 60.

FIG. 5B illustrates an exemplary computation for determining capture priority scores according to one aspect of the present disclosure. Each user account 530-1:4 is given points to allocate among the subject faces 171-1:6 based on the number of remuneration policies 181-187 the user account has agreed to. The points 680 allocated to user account A is 4, user account B is 2, user account C is 1 and user account D is 3 as computed in FIG. 6B 670:1-4. The user of the user account 530-1:4 is then enabled to spread those points 680 across 6 subject faces 171-1:6. A score is determined 560-1:6 for each subject face by summing the number of points 680 each user assigned to the subject face 171-1:6. The result of the computation shows that subject face B has the highest score of 4, followed by subject face C with a score of 3, subject face A is 2, subject face E is 1, followed sub subject faces D & F with a score of 0. The capture priority for a subject face 171-1:6 is then determined by sorting the subject faces 171-1:6 according to their scores 560-1:6. The drone device is thus instructed to prioritize capturing the subject faces 171-1:6 based on their rank in the sort.

In some embodiments, the server device 60 may obtain event information for several events. Each event may have multiple participants, each with their own factors-of-interest information and remuneration policies. The server device 60 may determine for each event, an opportunity score, where the opportunity score represents an estimated amount of remuneration for a drone device 40 covering the event. In some embodiments, the server device 60 may assign a drone device 40 to an event based on the opportunity score. In some embodiments, the opportunity scores are sent to the drones, and the drones are allowed to determine the event they would like to cover.

Figure 6A:
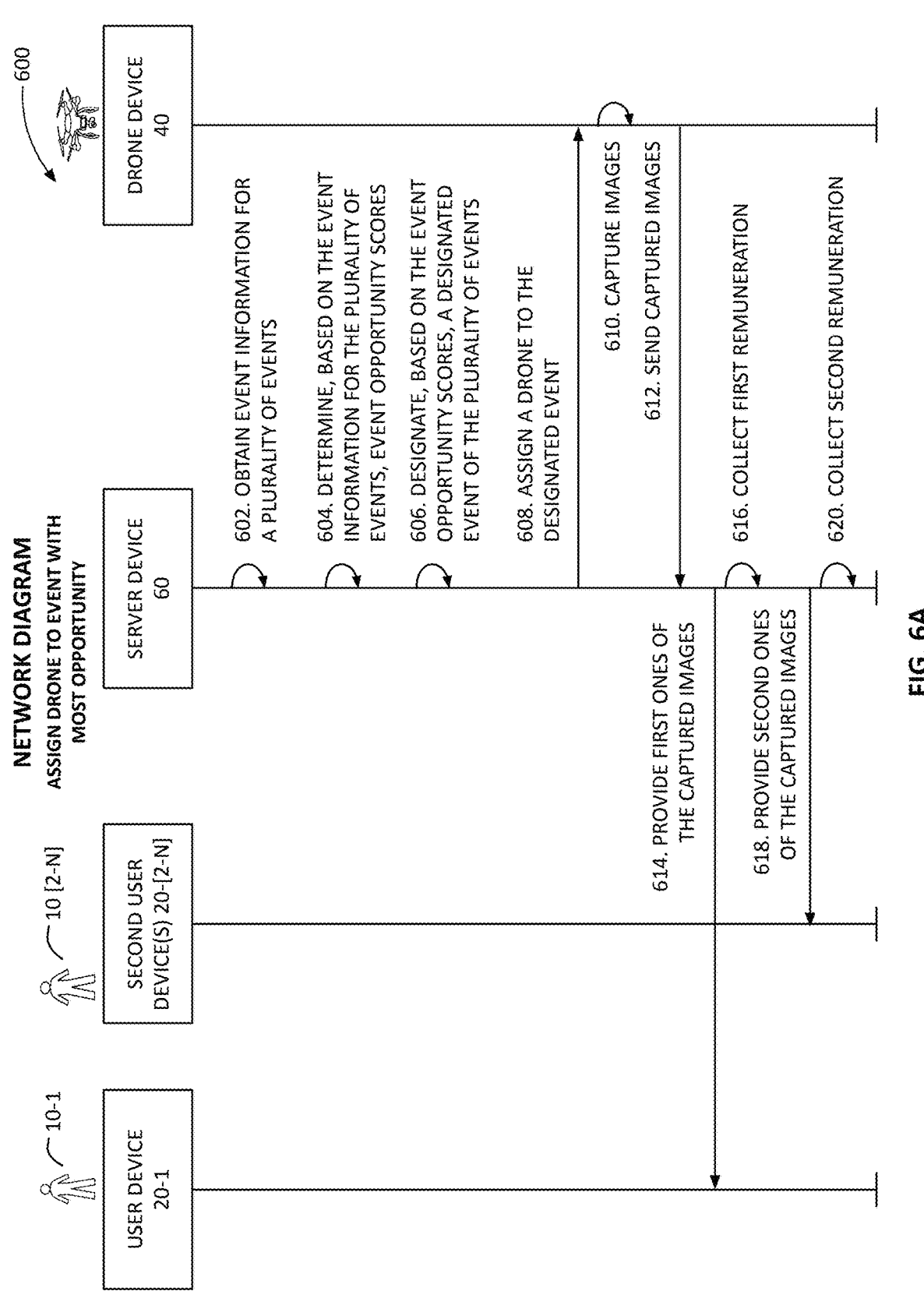
FIG. 6A illustrates a network diagram for operating drone imaging where a drone is assigned to an event determined from a plurality of events based on event opportunity scores.

FIG. 6A illustrates a network diagram 600 for a scenario where a drone device 40 is assigned to service an event of a plurality of events. The drone device 40 is assigned to the event based on an event opportunity score. Referring now to FIG. 6A, the server device 60 obtains event information for a plurality of events 602. The server device 60 determines, based on the event information for a plurality of event opportunities 604, a plurality of corresponding opportunity scores. The server device 60 designates 606, based on the event opportunity scores, a designated event, and assigns 608 the designated drone device 40. The drone device 40 captures 610 images. The captured images are sent 612 to the server device 60. First ones of the captured images are sent 614 to the first user device 20-1, and first remuneration is collected 616 at the server device 60. Second ones of the captured images are sent 618 to the second user device 20-2, and second remuneration is collected 620 at the server device 60. In some embodiments, the images are provided as available or requested, and remuneration is batched at a later date.

Figure 6B:
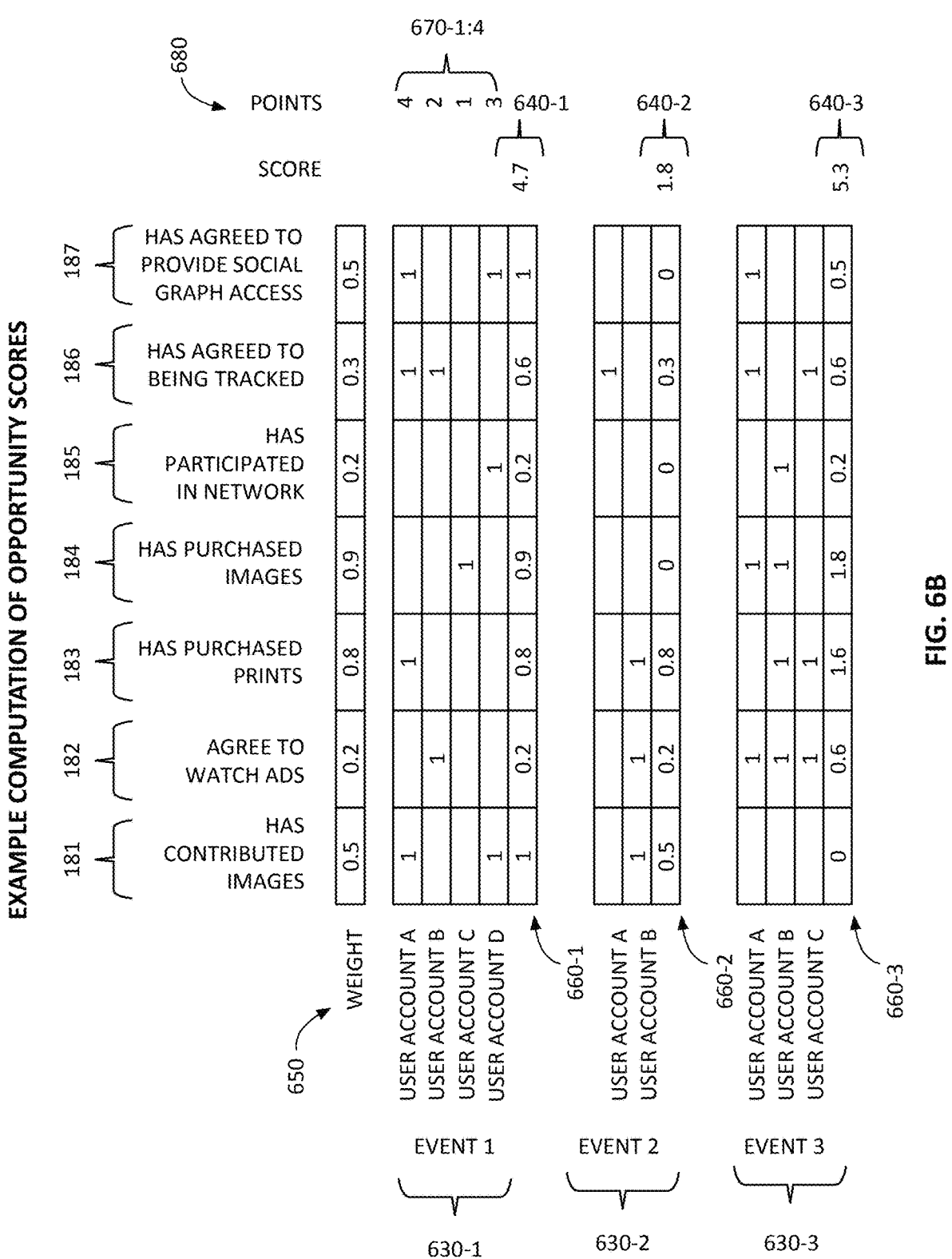
FIG. 6B illustrates an exemplary computation for determining opportunity scores.

FIG. 6B illustrates an exemplary computation for determining event opportunity scores. Three events are shown

630-1:3. Event One 630-1 has four participants (User Account A, B, C, D), Event Two 630-2 has two participants (User Account A, B), and Event Three 630-3 has three participants (User Account A, B, C). The seven factors shown in FIG. 6B are shown along the top 181:187. Each of the seven factors is assigned a weight 650. The sub totals 660-X are determined by taking the product of the weights 650 and the occurrence counts for each participant. The opportunity scores 640-X are determined by taking the sum of the sub totals 660. In some embodiments, the event with the highest opportunity score is designated 606.

FIG. 7 illustrates a network diagram 700 for a scenario where the drone device captures one or more images, and the server device 60 analyzes the images to determine one or more users appearing in the images. The server device 60 then invites the one or more users by matching the subject faces to the users of a social network using facial recognition and location history, and using address information from the social network to invite the users to join a sharing pool. Referring now to FIG. 7, the server device 60 first registers 701 the presence of the user device 20 associated with the user 10. The drone device 40 captures a first plurality of images 702 which are sent 704 to the server device 60. In some embodiments, the server device 60 will form 704 a sharing pool around the first plurality of images, or if a sharing pool already exists, it will add the first plurality of images to the existing sharing pool. The server device 60 will analyze 706 the first plurality of images to determine factors-of-interest. Factors-of-interest may include subject faces, geographical locations, subject tracking information, user tracking information, etc. Based on the factors-of-interest, addressing information based on ones of the factors-of-interest is determined 708. An invitation is sent 710 using the addressing information. The invitation is presented 712 at the user device 20. If the invitation is accepted, an acceptance is sent 714 to the server device 60. Ones of the plurality of images captured by the drone are sent to the user device 20.

In some embodiments, a user of a user device 20 may sign into the drone service using their social networking credentials. By doing so, this enables the drone service to provide the drone device 40 and/or drone operator device 80 and drone operator 12 with information from the users 10 social graph. This social graph information 134 may comprise information such as a subject face image of the user 10 and subject face images of the friends of that user. The social graph information 134 may also include geographical location information for the user and the friends of the user (including the current location which may be periodically updated). Using the social graph information 134 for the user and their friends, the drone may be able to better locate and take images of the users as they move around.

Figure 8:
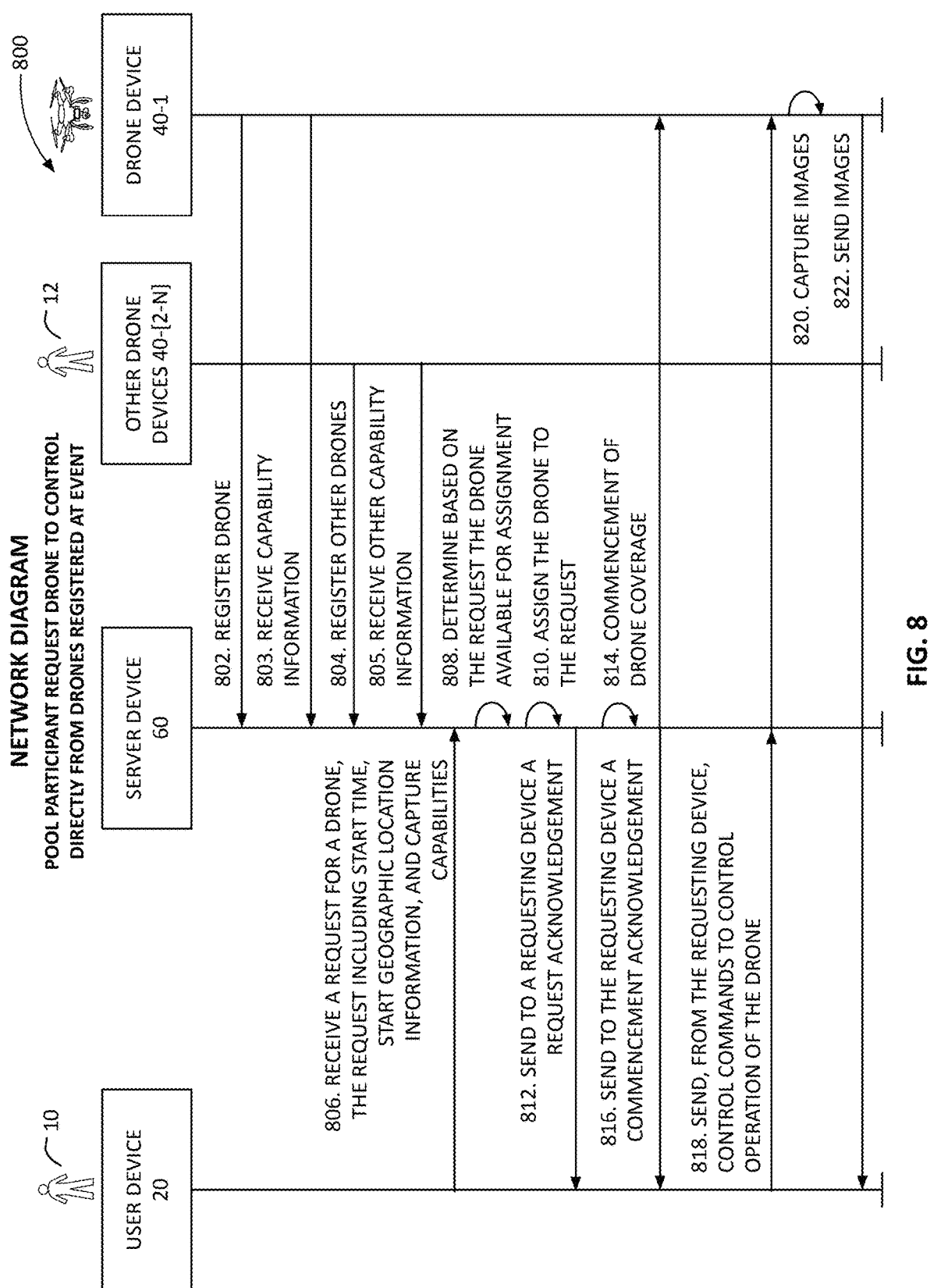
FIG. 8 illustrates a network diagram for operating drone imaging where a plurality of drones register with the server device and a user device is operable to receive control of one of the drones.

FIG. 8 illustrates a network diagram 800 for a scenario where one or more drones are registered with the server device, and the server device matching and assignment of a drone device of the one or more drone devices to the requesting mobile device. Referring now to FIG. 8, a drone device 40-1 registers 802 with the server device 60 and sends 803 capability information. Other drones 40-[2-N] register 804 with the server device 60 and provide 805 other capability information for each of the other respective drones 40-[2-N]. The server device 60 receives 806 a request for a drone device 40, the request including a start time, start location, and capture capabilities. The server device 60 determines 808 a drone based on the request information and assigns 810 the drone to the user device 20. Notification of assignment is sent 812 to the user device 20. Once the start time is reached 814 and the user device is in control of the drone device 40, another notification is sent to the user device 816. The user device 20 sends 818 control commands to the drone and receives status information. Guided by the user device 20, the drone device 40 captures 820 images and sends 822 them to the user device 20.

Figure 9:
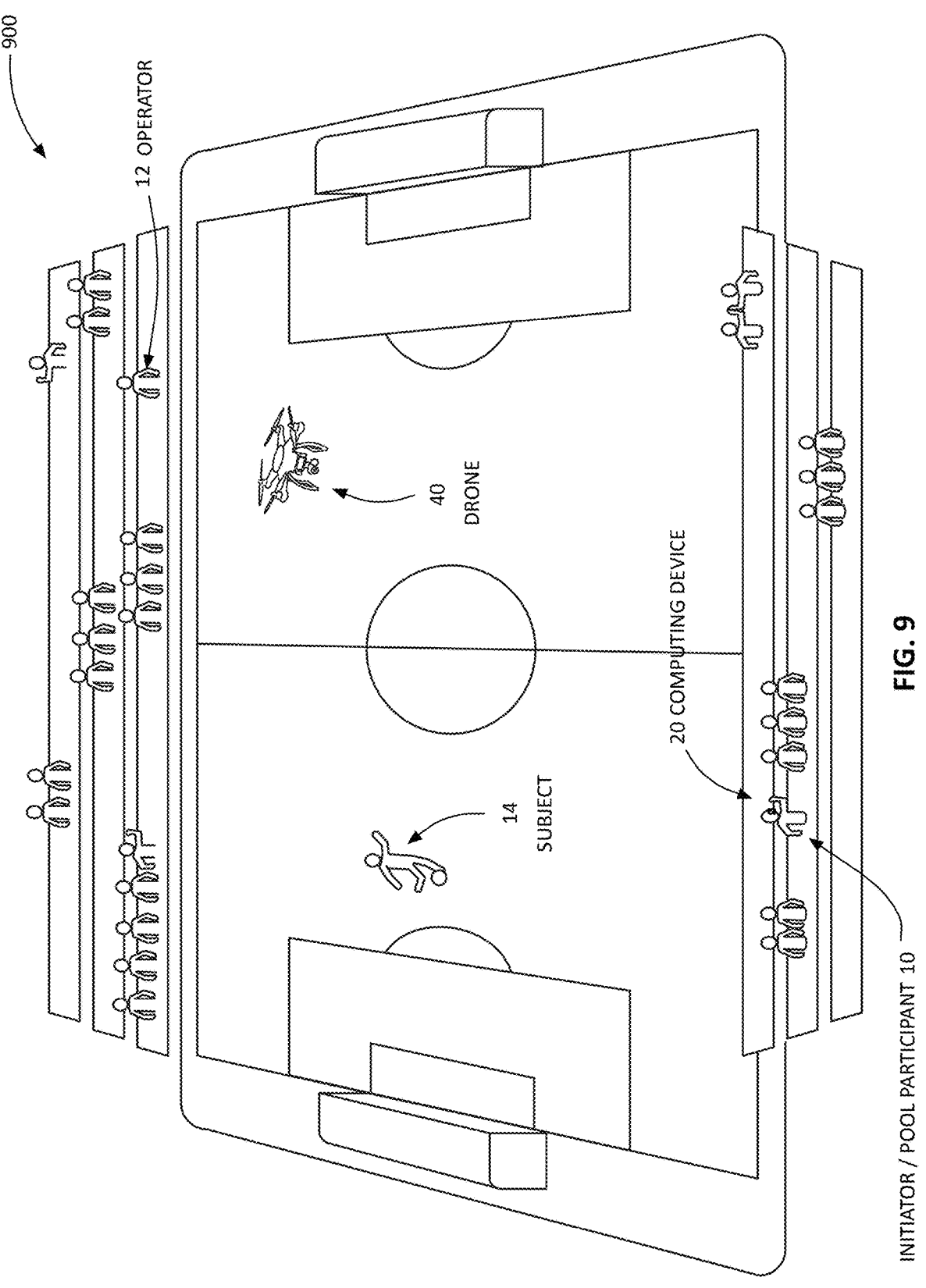
FIG. 9 is an aerial view illustrating the use of drone imaging at a sporting event.

FIG. 9 is an aerial view 900 illustrating the use of drone imaging at a sporting event, in this case a soccer game. A drone device 40 is operated by a drone operator 12. A user device 20 is operated by a user 10 who may also be a pool participant and/or an initiator. A subject 14 may be any person attending the event, including the operator 12 and the user 10.

Figure 10:
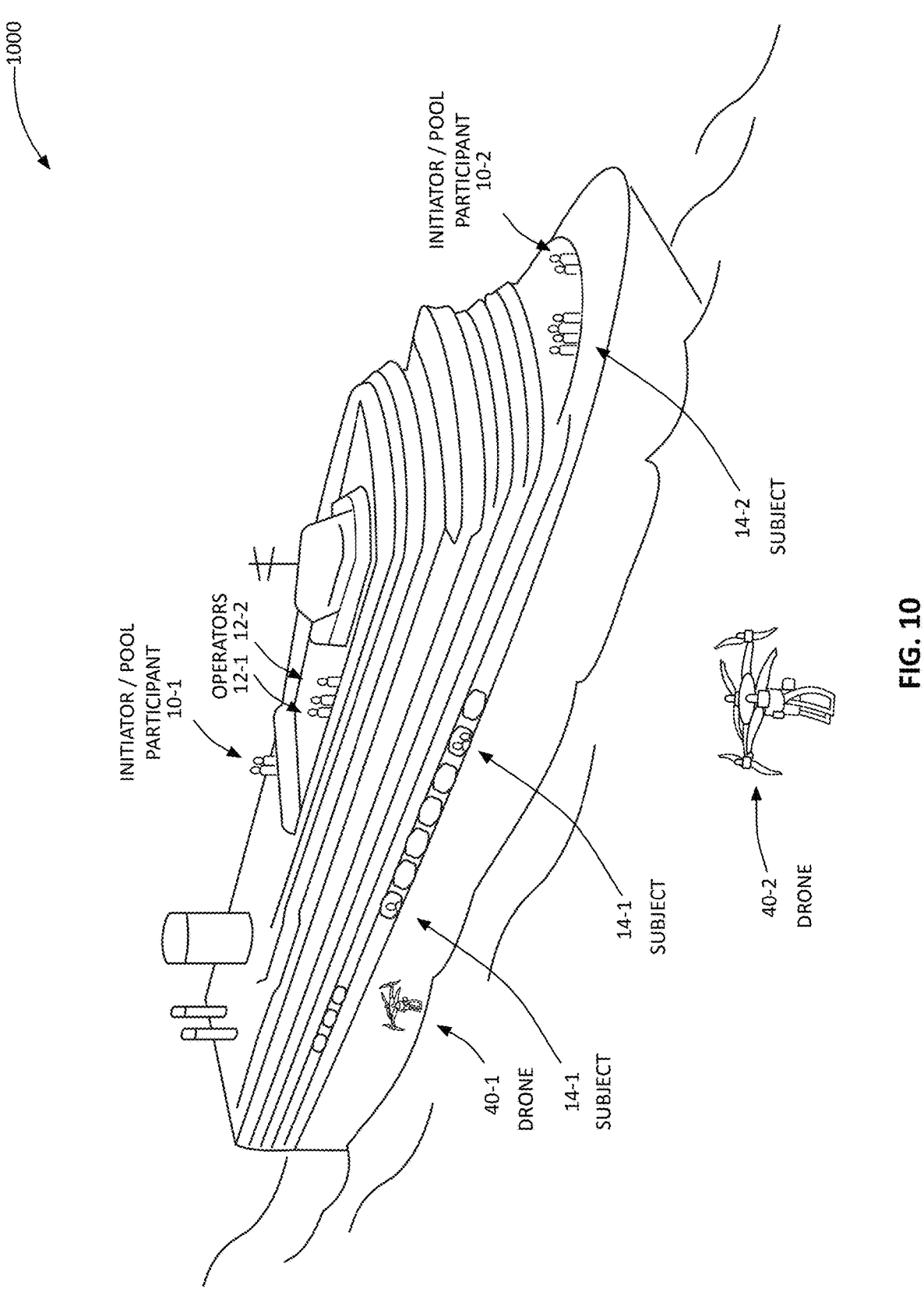
FIG. 10 is an aerial view illustrating the use of drone imaging at a vacation event.

FIG. 10 is an aerial view 1000 illustrating the use of drone imaging at a vacation event, in this case a cruise. Multiple drone devices 40-1 and 40-2 are operated by corresponding drone operators 12-1 and 12-2. User device 20-1 and 20-2 (not shown) are operated by users 10-1 and 10-2 who may also be pool participants and/or initiator. Subjects 14-1 and 14-2 may be any person attending the event, including the operators 12-1 and 12-2 and users 10-1 and 10-2.

Figure 11:
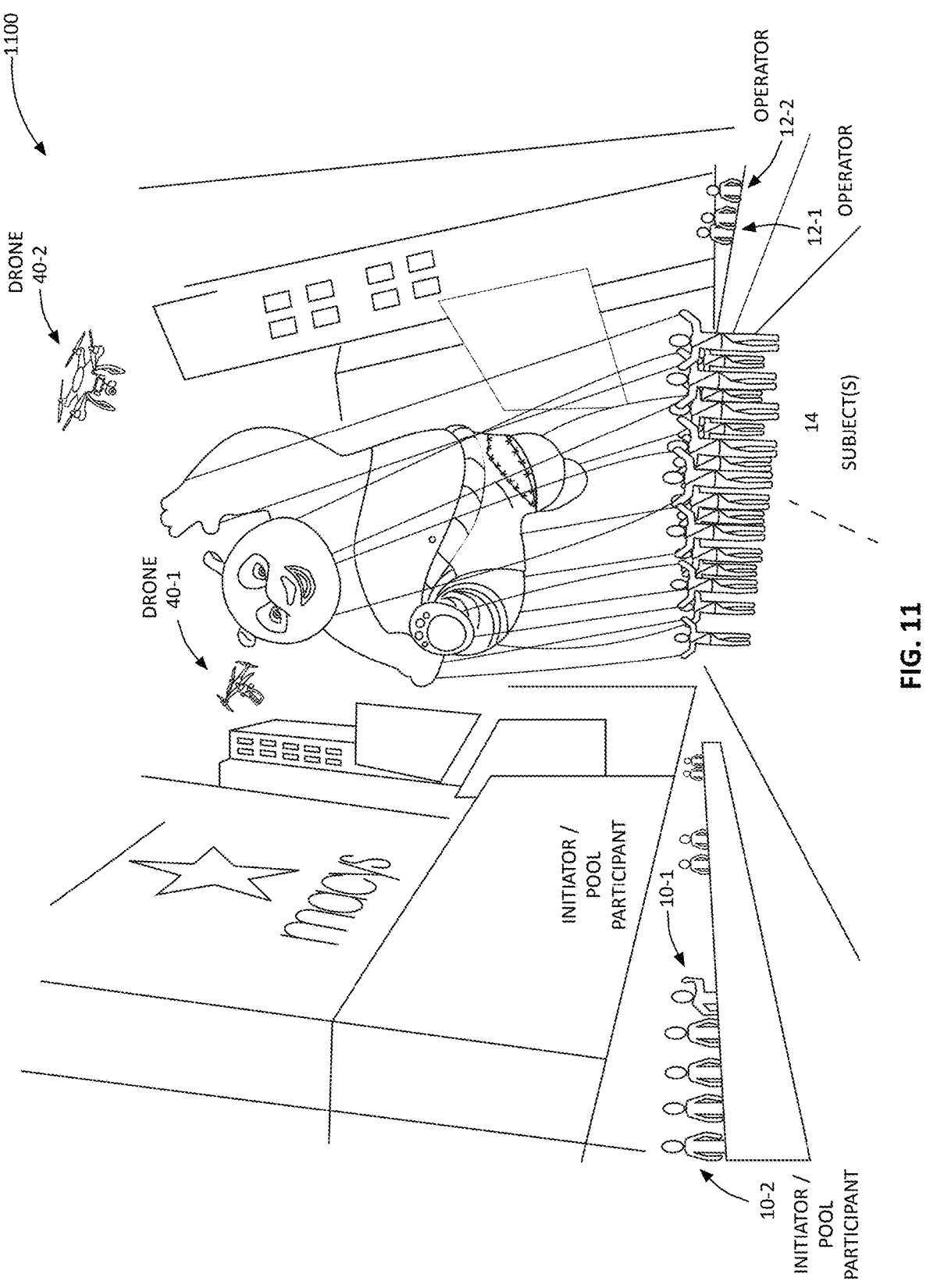
FIG. 11 is an aerial view illustrating the use of drone imaging at a parade event.

FIG. 11 is an aerial view 1100 illustrating the use of drone imaging at a public event, in this case a parade. Multiple drone devices 40-1 and 40-2 are operated by corresponding drone operators 12-1 and 12-2. User device 20-1 and 20-2 (not shown) are operated by users 10-1 and 10-2 who may also be pool participants and/or initiator. Subjects 14-1 and 14-2 may be any person attending the event, including the operators 12-1 and 12-2 and users 10-1 and 10-2.

Figure 12:
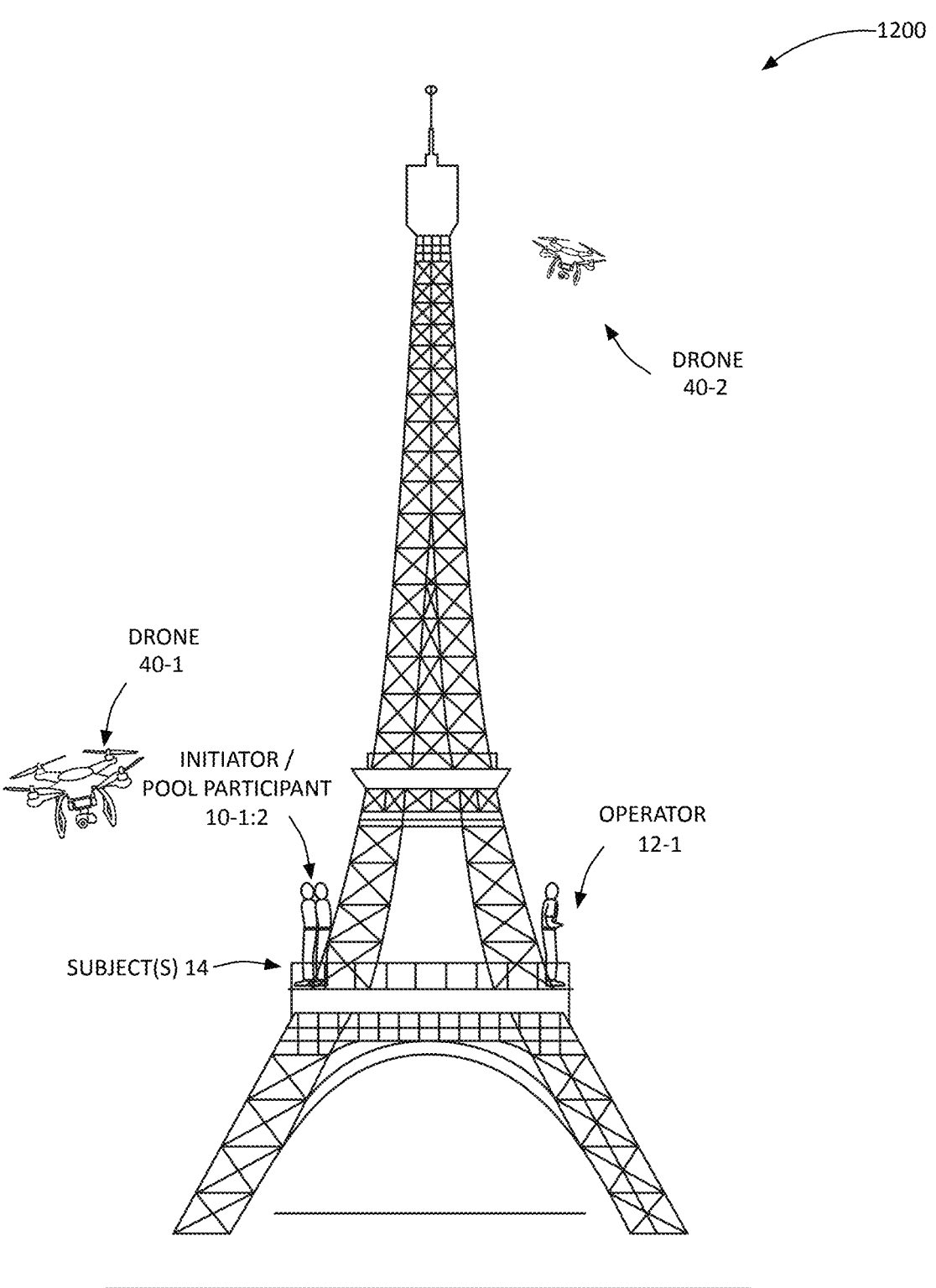
FIG. 12 is an aerial view illustrating the use of drone imaging at a landmark viewing event.

FIG. 12 is an aerial view 1200 illustrating the use of drone imaging at a public structure viewing event, in this case a visit to the Eiffel Tower. Multiple drone devices 40-1 and 40-2 are operated by corresponding drone operators 12-1 and 12-2. User device 20-1 and 20-2 (not shown) are operated by users 10-1 and 10-2 who may also be pool participants and/or initiator. Subjects 14-1 and 14-2 may be any person attending the event, including the operators 12-1 and 12-2 and users 10-1 and 10-2.

Figure 13:
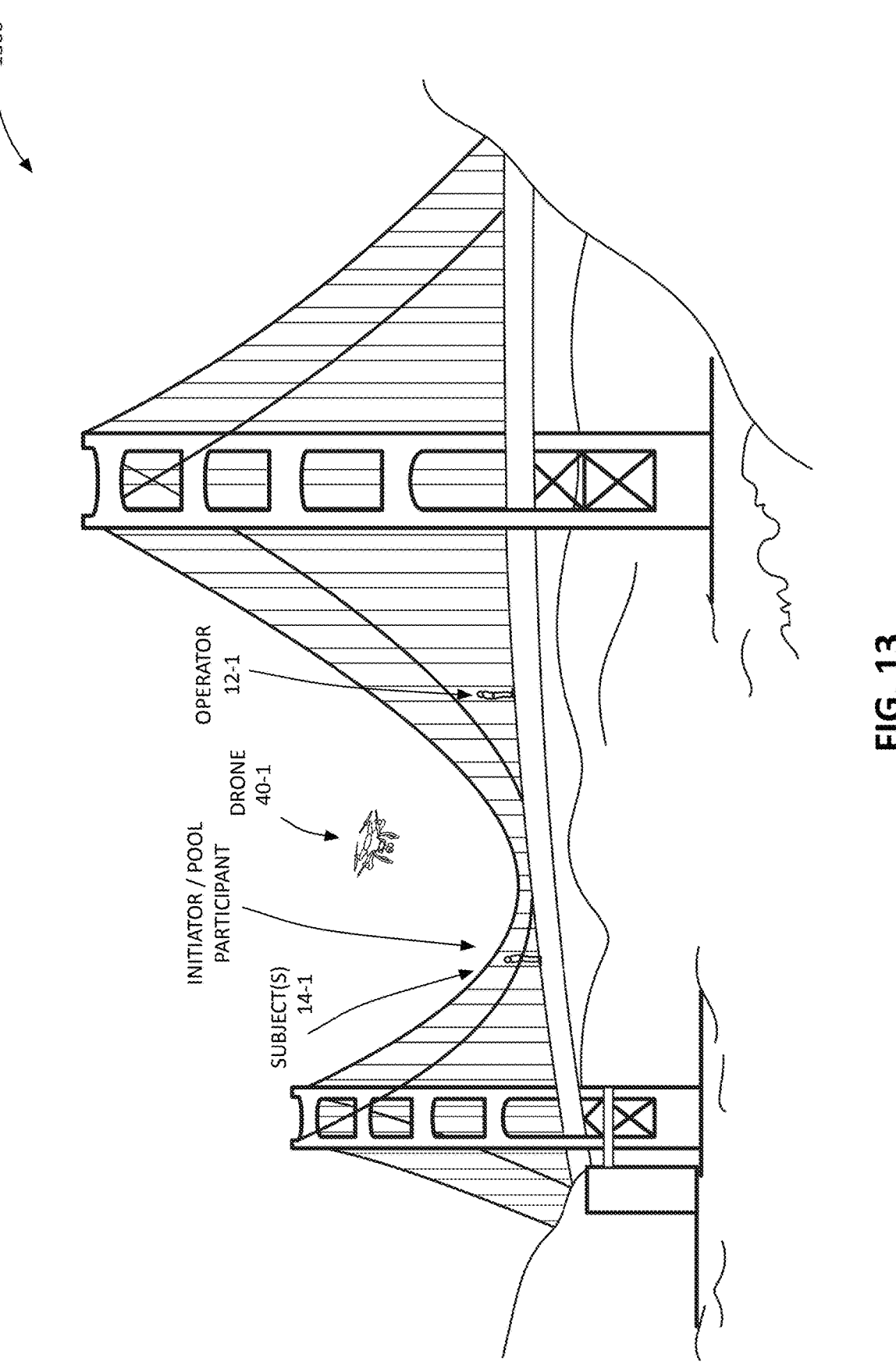
FIG. 13 is an aerial view illustrating the use of drone imaging at an landmark viewing event.

FIG. 13 is an aerial view 1300 illustrating the use of drone imaging at an outdoor structure viewing event, in this case the Golden Gate Bridge. A drone devices 40-1 is operated by a corresponding drone operator 12-1. User device 20-1 (not shown) is operated by user 10-1 who may also be pool participants and/or initiator. Subject 14-1 may be any person attending the event, including the operator 12-1 and users 10-1.

Figure 14:
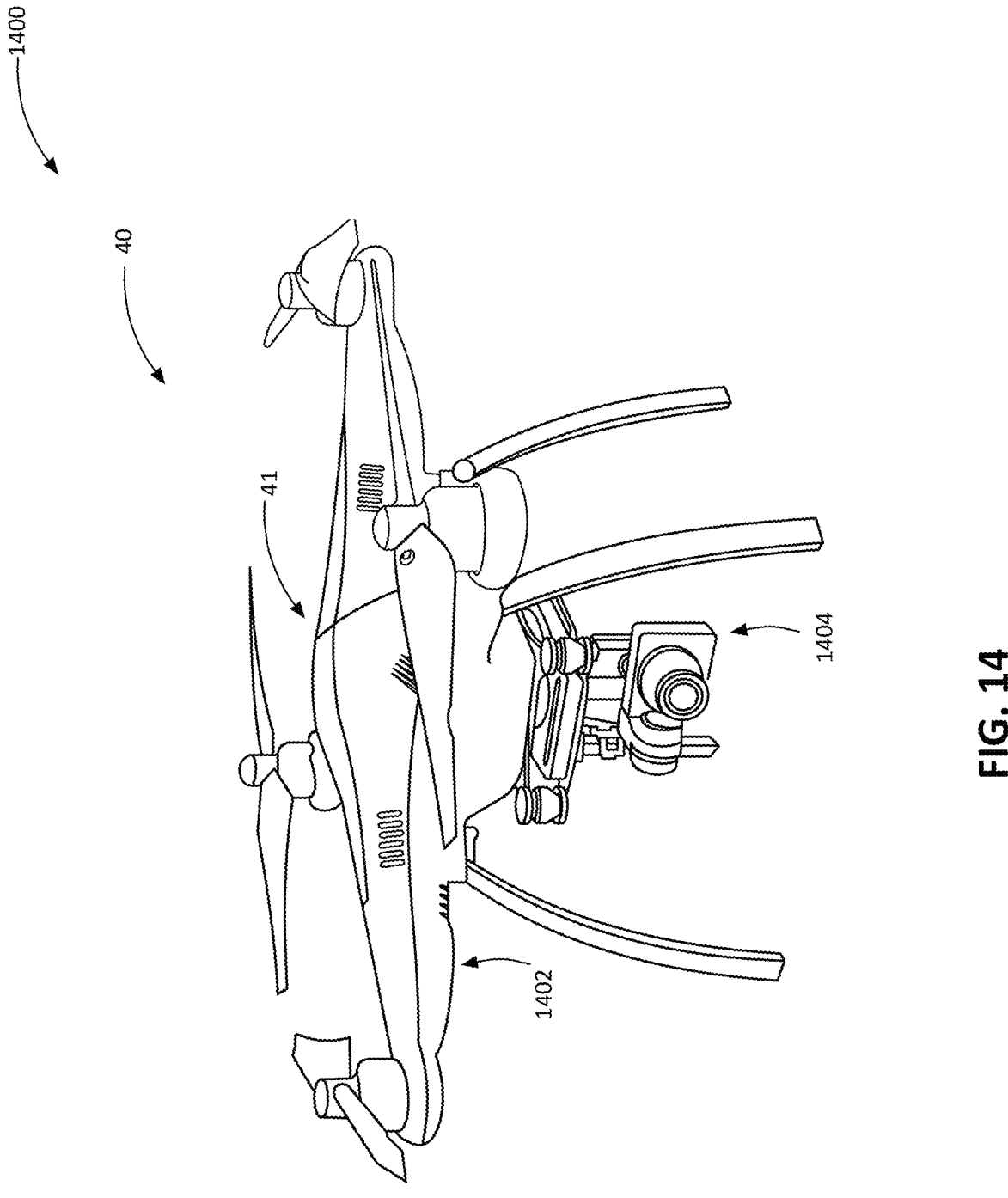
FIG. 14 is a side view of an exemplary drone device.

FIG. 14 is a side view of an exemplary drone device 40. The drone device 40 is comprised of a control system 41, propulsion system 1402 and an imaging subsystem 1404. An example of a moderately priced commercially available consumer drone with image capture features is the DJI Phantom Drone line. The DJI Phantom 3 Standard has a flight time of 25 minutes, captures video at up to 2.7K at 30 fps. The remote communicates with the drone at ranges up to 1000 meters over a 2.7 KHz radio link 16. The imaging subsystem 1404 may be a built-in component, an external component such as a GoPro camera, or some combination thereof.

Figures 15, 16:
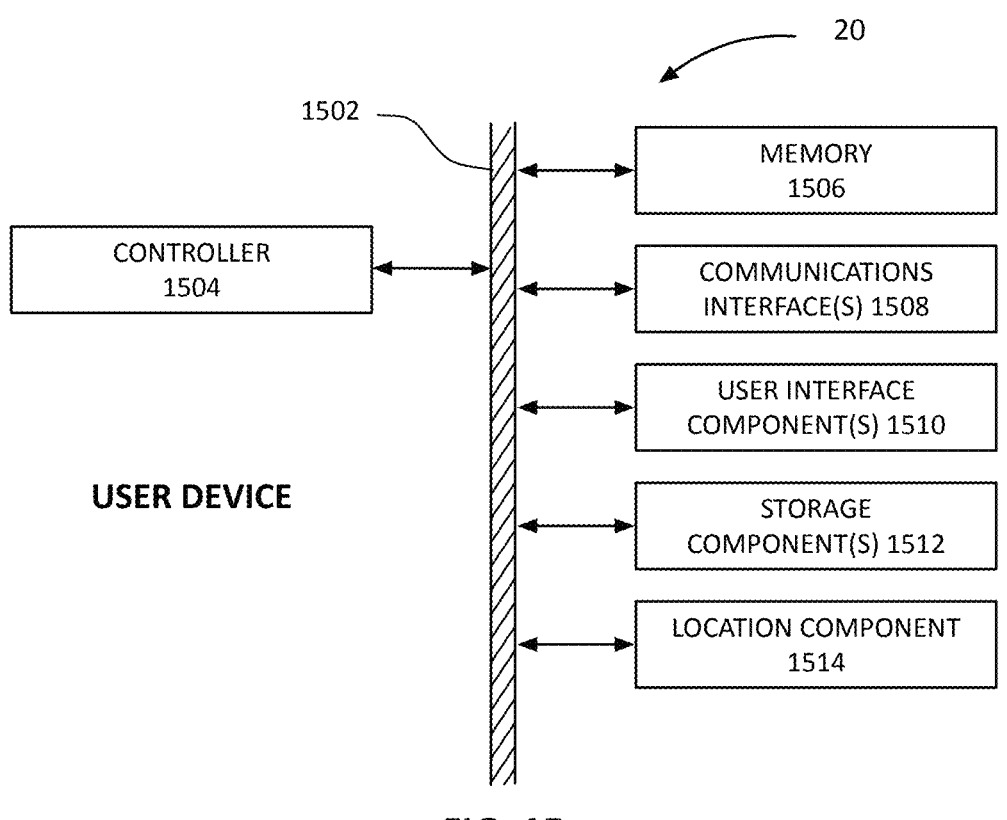
FIG. 15 is a block diagram of the drone operator device of FIGS. 1A, 1B and 1C according to some aspects of the present disclosure.
FIG. 16 is a block diagram of the drone device of FIGS. 1A, 1B and 1C according to some aspects of the present disclosure.

FIG. 15 is a block diagram of a user device 20 according to one embodiment of the present disclosure. As illustrated, the user device 20 includes a controller 1504 connected to memory 1506, one or more communications interfaces 1508, one or more user interface components 1510, one or more storage components 1512, and a location component 1514 by a bus 1502 or similar mechanism. The controller 1504 is a microprocessor, digital ASIC, FPGA, or the like. In general, the user device 20 includes a control system 21 having associated memory 1506. In this embodiment, the controller 1504 is a microprocessor, and the user interface (UI) module 22, communications module 23, imaging module 24, and configuration module 25 are implemented in software and stored in the memory 1506 for execution by the controller 1504. However, the present disclosure is not limited thereto. The aforementioned functions and module may be implemented in software, hardware, or a combination thereof. The user device 20 also includes a communication interface 1508 enabling the user device 20 to connect to the network 15. The one or more user interface components 1510 include, for example, a touchscreen, a display, one or more user input components (e.g., a keypad), a speaker, or the like, or any combination thereof. The storage component(s) 1512 is a non-volatile memory. In this embodiment, the location component 1514 is a hardware component, such as a GPS receiver. However, the present invention is not limited thereto.

FIG. 16 is a block diagram of a drone device 40 according to one embodiment of the present disclosure. As illustrated, the drone device 40 includes a controller 1604 connected to memory 1606, one or more communications interfaces 1608, one or more user interface components 1610, location component 1612, one or more storage components 1614, guidance sensors 1616 by a bus 1602 or similar mechanism. The controller 1604 is a microprocessor, digital ASIC, FPGA, or the like. In general, the drone device 40 includes a control system 41 having associated memory 1606. In this embodiment, the controller 1604 is a microprocessor, and the guidance module 42, communications module 43, power management 44, and capture module 45, storage module 46, and a synchronization module 47 are implemented in software and stored in the memory 1606 for execution by the controller 1604. However, the present disclosure is not limited thereto. The aforementioned functions and module may be implemented in software, hardware, or a combination thereof. The user device 20 also includes a communication interface 1608 enabling the drone device 40 to connect to the network 15 and to the drone operator device 80 over the radio link 16. The one or more user interface components 1610 include, for example, a touchscreen, a display, one or more user input components (e.g., a keypad), a speaker, or the like, or any combination thereof. In this embodiment, the location component 1612 is a hardware component, such as a GPS receiver. The storage component(s) 1614 is a non-volatile memory of any number of forms. The guidance sensors 1616 may be one or more of accelerometers, engine intake flow sensors, magnetic sensors, tilt sensors, current sensors, and inertial measurement units.

Referring now to the various guidance sensors 1616, accelerometers are used to determine position and orientation of the drone in flight. Like your Nintendo Wii controller or your iPhone screen position, these small silicon-based sensors play a key role in maintaining flight control. MEMS accelerometers sense movement in several ways. One type of technology senses the micro movement of very small structures embedded small integrated circuit. The movement of these small 'diving boards' change the amounts of electrical current moving through the structure, indicating change of position relative to gravity. Another technology used in accelerometers is thermal sensing which offers several distinct advantages. It does not have moving parts, but instead senses changes in the movement of gas molecules passing over a small integrated circuit. Because of the sensitivity of these sensors, they play a role in stabilizing on-board cameras, which are vital for applications like filmmaking. By controlling up and down movement, as well as removing jitter and vibration, filmmakers are able to capture extremely smooth looking video. Additionally, because these sensors are more immune to vibrations than other technologies, thermal MEMS sensors are perfect in drone applications to minimize problems from the increased vibration generated by the movement of rotating propulsion fans/propellers.

Combined with GPS, inertial measurement units (IMUs) are critical for maintaining direction and flight paths. As drones become more autonomous, these are essential to maintain adherence to flight rules and air traffic control. IMUs units use multi-axis magnetometers that are, in essence, small, accurate compasses. These sense changes in direction and feed data into a central processor, which ultimately indicates direction, orientation, and speed.

Tilt sensors, combined with gyros and accelerometers provide input to the flight control system in order to maintain level flight. This is extremely important for applications where stability is paramount, from surveillance to delivery of fragile goods. These types of sensors combine accelerometers with gyroscopes, allowing the detection of small variations of movement. It is the gyroscope compensation that allows these tilt sensors to be used in moving applications like motor vehicles or drones.

In drones, power consumption and use are important, particularly those that are battery powered. Current sensors can be used to monitor and optimize power drain, safe charging of internal batteries, and detect fault conditions with motors or other areas of the system. Current sensors work by measuring electrical current (bi-directional) and ideally provide electrical isolation to reduce power loss and eliminate opportunity for electrical shock or damage to the user or systems.

Sensors with fast response time and high accuracy optimize the battery life and performance of drones.

In drones, electronic compasses provide critical directional information to inertial navigation and guidance systems. Anisotropic magnetoresistive (AMR) permalloy technology sensors, which have superior accuracy and response time characteristics while consuming significantly less power than alternative technologies, are well-suited to drone applications. Turnkey solutions provide drone manufacturers with quality data sensing in a very rugged and compact package.

Engine intake flow sensors can be used to effectively monitor air flow into small gas engines used to power some drone varieties. These help the engine CPU determine the proper fuel-to-air ratio at specified engine speed, which results in improved power and efficiency, and reduced emissions. Many gas engine mass flow sensors employ calorimetric principal utilizing a heated element and at least one temperature sensor to quantify mass flow. MEMS thermal mass air flow sensors also utilize calorimetric principal but in a micro scale, making it highly suitable for applications where reduced weight is critical.

Figure 17:
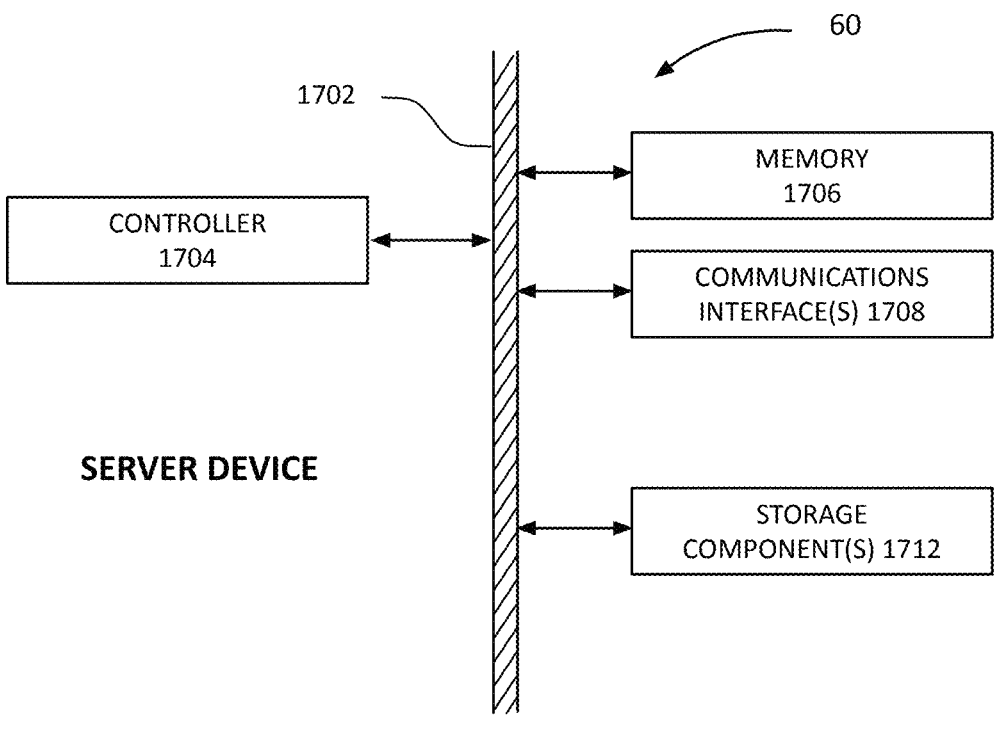
FIG. 17 is a block diagram of the server device of FIGS. 1A, 1B and 1C according to some aspects of the present disclosure.

FIG. 17 is a block diagram of a server device 60 according to an embodiment of the present disclosure. As illustrated, server device 60 includes a controller 1704 connected to a memory 1706, one or more secondary storage components 1712, and one or more communications interfaces 1708 by a bus 1702 or similar mechanism. The controller 1704 is a microprocessor, digital Application Specific Integrated Circuit ASIC, Field Programmable Gate Array FPGA, or the like. In general, the server device 60 includes a control system 61 having associated memory 1706. In this embodiment, the controller 1704 is a microprocessor, and the event management module 62, user management module 63, device management module 64, drone management module 65, image analysis engine 66, and invitation management module 67 are implemented in software and stored in the memory 1706 for execution by the controller 1704. However, the present disclosure is not limited thereto. The aforementioned module may be implemented in software, hardware, or a combination thereof. Further, the event registry 100, user registry 102, devices registry 104 and drones registry 106 may be stored in the one or more secondary storage components 1712. The secondary storage components 1712 are digital data storage components such as, for example, one or more hard disk drives. The server device 60 also includes a communication interface 1708 enabling the server device 60 to connect to the network 15.

Those skilled in the art will recognize improvements and modifications to the embodiments of the present disclosure. All such improvements and modifications are considered within the scope of the concepts disclosed herein and the claims that follow.

What is claimed is:

1. A computer-implemented method of operating a drone device comprising:

receiving capture instructions identifying one or more subject faces found in a collection of images stored at a user device;

positioning the drone device based on priorities assigned to the one or more subject faces; and capturing an image including the one or more subject faces identified in the capture instructions.

2. The computer-implemented method of claim 1 further comprising:

coupling the drone device to a server device and the user device over a wireless network using a network interface associated with the drone device; and receiving the capture instructions from the server device based on information received at the server device from the user device identifying the one or more subject faces.

3. The computer-implemented method of claim 2 further comprising:

enabling the image to be delivered to the user device.

4. The computer-implemented method of claim 1 further comprising:

coupling the drone device to the user device over a wireless network using a network interface associated with the drone device;

receiving the capture instructions from the user device; and causing the image to be delivered to the user device.

5. The method of claim 4, wherein the wireless network is a cellular communications network, and the user device is a smartphone.

6. The computer-implemented method of claim 1, wherein capturing the image comprises:

matching the one or more subject faces identified in the capture instructions to one or more subject faces detected by a capture module of the drone device; and capturing the image including the one or more subject faces based on the match.

7. One or more non-transitory computer-readable media storing instructions that, when executed by one or more processors of a drone device, cause the drone device to perform the steps of:

receiving capture instructions identifying one or more subject faces found in a collection of images stored at a user device;

positioning the drone device based on priorities assigned to the one or more subject faces; and capturing an image including the one or more subject faces identified in the capture instructions.

8. The one or more non-transitory computer-readable media of claim 7 further comprising:

receiving the capture instructions from the user device; and causing the image to be delivered to the user device.

9. The one or more non-transitory computer-readable media of claim 8, comprising receiving the capture instructions from the user device over a cellular communications network; and causing the image to be delivered to the user device over the cellular communications network, wherein the user device is a smartphone.

10. The one or more non-transitory computer-readable media of claim 7, wherein capturing the image comprises:

matching the one or more subject faces identified in the capture instructions to one or more subject faces detected by a capture module of the drone device; and capturing the image including the one or more subject faces based on the match.

11. The one or more non-transitory computer-readable media of claim 7, wherein receiving the capture instructions comprises:

receiving geographic location information identifying a geographic location of a subject corresponding to a subject face of the one or more subject faces found in the collection of images.

12. The one or more non-transitory computer-readable media of claim 11, wherein the geographic location of the subject is determined based on the geographic location of the user device associated with the subject.

13. The one or more non-transitory computer-readable media of claim 12, wherein capturing the image comprises:

positioning the drone device based on the geographic location information.

14. A drone device comprising:

one or more memories storing instructions; and one or more processors that are coupled to the one or more memories and, when executing the instructions, are operable to perform the steps of:

receiving capture instructions identifying one or more subject faces found in a collection of images stored at a user device;

positioning the drone device based on priorities assigned to the one or more subject faces; and capturing an image including the one or more subject faces identified in the capture instructions.

15. The drone device of claim 14 further comprising:

a network interface coupled to the one or more memories and the one or more processors further operable to perform the steps of:

coupling the drone device to the user device over a wireless network using the network interface associated with the drone device;

receiving the capture instructions from the user device; and causing the image to be delivered to the user device.

16. The drone device of claim 15, wherein the wireless network is a cellular communications network, and the user device is a smartphone.

17. The drone device of claim 14, wherein capturing the image comprises:

matching the one or more subject faces identified in the capture instructions to one or more subject faces detected by a capture module of the drone device; and capturing the image including the one or more subject faces based on the match.

18. The drone device of claim 14, wherein receiving the capture instructions comprises:

receiving geographic location information identifying a geographic location of a subject corresponding to a subject face of the one or more subject faces found in the collection of images.

19. The drone device of claim 18, wherein the geographic location of the subject is determined based on the geographic location of the user device associated with the subject.

20. The drone device of claim 19, wherein capturing the image comprises:

positioning the drone device based on the geographic location information.

\*    \*    \*    \*    \*